(12) United States Patent
Sai et al.

(10) Patent No.: US 12,537,697 B2
(45) Date of Patent: Jan. 27, 2026

(54) DIGITAL CERTIFICATES

(71) Applicant: COMMONWEALTH SCIENTIFIC AND INDUSTRIAL RESEARCH ORGANISATION, Australian Capital Territory (AU)

(72) Inventors: Yilin Sai, Australian Capital Territory (AU); Shiping Chen, Australian Capital Territory (AU)

(73) Assignee: COMMONWEALTH SCIENTIFIC AND INDUSTRIAL RESEARCH ORGANISATION, Australian Capital Territory (AU)

( * ) Notice: Subject to any disclaimer, the term of this patent is extended or adjusted under 35 U.S.C. 154(b) by 41 days.

(21) Appl. No.: 18/579,267

(22) PCT Filed: Jul. 15, 2022

(86) PCT No.: PCT/AU2022/050743
§ 371 (c)(1),
(2) Date: Jan. 12, 2024

(87) PCT Pub. No.: WO2023/283693
PCT Pub. Date: Jan. 19, 2023

(65) Prior Publication Data
US 2024/0364540 A1    Oct. 31, 2024

(30) Foreign Application Priority Data
Jul. 16, 2021  (AU) .................................. 2021902199

(51) Int. Cl.
*H04L 9/32*        (2006.01)
(52) U.S. Cl.
CPC .................................. *H04L 9/3263* (2013.01)
(58) Field of Classification Search
None
See application file for complete search history.

(56) References Cited

U.S. PATENT DOCUMENTS

| | | | |
|---|---|---|---|
| 6,671,804 B1 * | 12/2003 | Kent | .................... H04L 63/0823 |
| | | | 713/161 |
| 10,068,074 B2 | 9/2018 | Mercury et al. | |

(Continued)

FOREIGN PATENT DOCUMENTS

| | | |
|---|---|---|
| CN | 102801532 B | 7/2015 |
| KR | 10-2177775 B1 | 11/2020 |

OTHER PUBLICATIONS

Alpár et al., "Credential Design in Attribute-Based Identity Management," Radboud University, Published: 2013, 17 pages.

(Continued)

*Primary Examiner* — Backhean Tiv
(74) *Attorney, Agent, or Firm* — Nixon & Vanderhye P.C.

(57) ABSTRACT

This disclosure relates to a certificate computer system. A rules store stores, for a template identifier, template identifiers of dependency certificates, attribute paths, and functions to compute output certificate attributes. A certificate metadata store stores, for a certificate identifier, a validity state, certificate identifiers of dependency certificates, and a hash value. A processor generates a certificate by receiving a request comprising a template identifier and dependency certificates. The processor queries a rules store to retrieve a template, and computes a value for the attributes by applying a function from the rules store on attribute values of the dependency certificates. The processor creates the output certificate including the computed value for the computed attributes. The processor may further verify an input certificate by comparing a hash value to the certificate metadata store and retrieving certificate identifiers of dependencies associated with the certificate identifier and checks if dependency certificates are valid.

18 Claims, 9 Drawing Sheets

(56) References Cited

U.S. PATENT DOCUMENTS

| | | | |
|---|---|---|---|
| 10,284,379 B1* | 5/2019 | Muftic | H04L 9/3265 |
| 10,885,530 B2 | 1/2021 | Mercury et al. | |
| 11,388,012 B2* | 7/2022 | Loreskar | G06F 21/57 |
| 11,563,590 B1* | 1/2023 | Bowen | H04L 9/3247 |
| 12,034,872 B1* | 7/2024 | Sharma | H04L 9/0861 |
| 2002/0062438 A1* | 5/2002 | Asay | G07F 7/08 |
| | | | 713/157 |
| 2002/0129024 A1* | 9/2002 | Lee | G06F 21/41 |
| 2006/0282663 A1* | 12/2006 | Wray | H04L 9/3263 |
| | | | 713/158 |
| 2018/0019993 A1* | 1/2018 | Kravitz | G06F 21/64 |
| 2018/0183592 A1* | 6/2018 | Campagna | H04L 9/0643 |
| 2019/0036710 A1* | 1/2019 | Qiu | H04L 9/3265 |
| 2019/0089691 A1* | 3/2019 | Mercury | H04L 63/0861 |
| 2019/0089692 A1* | 3/2019 | Mercury | H04L 67/131 |
| 2019/0158298 A1* | 5/2019 | Muftic | H04L 9/3265 |
| 2019/0372965 A1* | 12/2019 | Kravitz | H04L 9/3268 |
| 2020/0313904 A1* | 10/2020 | Ramgopal | H04L 9/3263 |
| 2024/0364540 A1* | 10/2024 | Sai | H04L 9/3247 |

OTHER PUBLICATIONS

Qiang Cao, et al., "Certificate linking and caching for logical trust", arXiv preprint arXiv: 1701.06562., Jan. 22, 2017, 16 pages.

Mary R. Thompson, et al., "Certificate-Based Authorization Policy in a PKI Environment", ACM Transactions on Information and System Security, vol. 6, No. 4, Nov. 2003, pp. 566-588 (26 pages).

Search Report for AU Application No. 2021902199 mailed Aug. 24, 2021, 24 pages.

International Search Report for PCT/AU2022/050743 mailed Sep. 21, 2022, 6 pages.

Written Opinion of the ISA for PCT/AU2022/050743 mailed Sep. 21, 2022, 8 pages.

* cited by examiner

DIGITAL CERTIFICATES

CROSS-REFERENCE TO RELATED APPLICATIONS

This application is the U.S. national phase of International Application No. PCT/AU2022/050743 filed Jul. 15, 2022 which designated the U.S. and claims priority to AU Provisional Application No. 20/219,02199 filed Jul. 16, 2021, the entire contents of each of which are hereby incorporated by reference.

TECHNICAL FIELD

This disclosure relates to issuing and verifying digital certificates.

BACKGROUND

Digital certificates are a secure way for an untrusted entity of providing a public key to a communication partner. In many configurations, there is a certificate authority (CA) which has a root certificate. This root certificate is a text file including information about the CA, such as name, address, etc. as well as the CA's public key. The root certificate further includes a cryptographic signature of the aforementioned information. The cryptographic signature is calculated by the CA using the private key that corresponds to the public key included in the root certificate. Since the private key is only accessible to the CA, no other party can calculate the signature to imposter the CA. On the other hand, any other party can verify the signature using the public key.

Root certificates are distributed through trusted channels, such as within an installation package of a browser application. Once the browser is installed on a local computer, the root certificate (including the CA's public key) is available.

The CA can now issue certificates for other parties. That is, another party, say Alice, generates a public key and provides the public key together with the Alice's information to the CA. The CA then calculates a signature using the CA's private key. Alice can now provide the party's information and public key to a further party, say Bob. Bob can now use the CA's public key stored locally from the browser installation to verify the CA's signature on Alice's certificate. If the signature is verified, Bob can be sure that the Alice's information and public key have not been tampered with. For example, it is not possible for Eve to pretend to be Alice and send Bob Eve's public key to steal secret information from Bob. Bob would see that the signature is not correct.

The method above can be expanded by introducing intermediate certificates that are signed by the CA and sign Alice's certificate instead of the CA signing Alice's certificate. This creates a "chain of trust" where each certificate can be verified one after another in a chain until the root certificate validates the entire chain from the beginning.

While these methods have been useful for authenticating many servers worldwide, there are limitations. First, CAs attract cyber attacks, which leads to high cost and risk for CA operators. This is because the validity of digital certificates relies on the CA that issues it. Once a CA is compromised, a malicious party that controls the CA can issue digital certificates at its own interest. Second, the chain of trust amplifies the security risk, by introducing a single point failure. The hierarchy among CAs means a subversion of the root CA leads to the subversion of all dependent CAs (i.e. the entire digital certificate system). Third, the system is only designed for proving the ownership of public keys. There is a strong need to have a flexible and trustworthy digital certificate system that supports certification in different domains, e.g., supply chains, education, and talent markets.

SUMMARY

This disclosure provides a change to a trusted issuer trust model, by partially/fully delegating the issuance process/power to smart contracts. Smart contracts are code that no entity controls after being deployed onto Blockchain. This means the validity of a certificate does not rely on a "trusted authority" if the issuance process can be handled fully by smart contracts. This solves the security problems presented in traditional digital certificate system, because without trusted authorities, there is no one to attack, and the decentralisation of Blockchain means there is no single point of failure.

A digital certificate in this disclosure is a set of attributes and attributes are key-value pairs. This makes the method/system domain-independent and flexible. Attributes can be nested and each attribute can be addressed by an attribute path.

In order to achieve the "delegation", the content (i.e. attributes) of a certificate is categorised into 2 categories
  the attributes that can be automatically computed (which means they are "delegatable")
  the attributes that need to be endorsed by a trusted authority (these attributes are not "delegatable"). An example is to certify one's work experience as part of a certificate, which needs human review.

So this disclosure provides methods to categorise the attributes in certificate and how the delegation is achieved (either partially or fully) ("fully" is when all attributes are computed, while "partially" is when some attributes are not computed but endorsed).

The implications and advantages of this "delegation to smart contract" provided in this disclosure are:
  the issuance process is more trustworthy (smart contracts are publicly auditable, tamper-proof, and always execute as written).
  the issuance is real-time: in traditional model, a certificate requestor waits months before the authority finishes the issuance process. In our system, the requestor gets an output certificate instantly/in real-time.
  the computed attributes are computed based on dependency certificates, which means the issuance/verification are dependency-aware.
  certificate requestor determines when and how the certificate is issued.
  if a use case allows a certificate to be fully computed (without endorsement) during issuance, then in that case we achieved the removal of trusted authority (i.e. issuer) without sacrificing trust/security.
  if a use case only allows a certificate to be partially computed during issuance (some certificate content need to be endorsed), then in that case we weakened the power of the issuer/endorser. A template may specify a whitelist of endorsers (using the schema), which empowers the requestor to choose his/her desired endorser, further weakening the power of an authority (i.e. an endorser).

In summary, the disclosed method removes the power from an authority, and gives more power to end users (i.e. the certificate requestors/verifiers) for efficient, flexible, and cost-effective trustworthy certification.

Since some attributes are computed based on attributes in dependency certificates, this disclosure provides an architecture for certificates where paths in the certificate tree can re-converge to a leaf node. As a result, a leaf certificate may require more than one parent certificate to be issued/validated. In other words, certificates in this disclosure form a Directed Acyclic Graph (DAG). This disclosure provides a certificate state store. Since the state of a certificate is a special case of meta-data, the certificate state store is also referred to as metadata store, which is a publicly accessible data store that stores the metadata (including the state) of individual certificates. The metadata of a certificate include (but not limited to) its dependency information and may include an indication of whether that certificate is valid/revoked.

There are also certificate templates, which are stored in a publicly accessible template store. Templates define schema of certificate, category of each attribute (computed or endorsed), and computation rules for computing the computed attributes. Because templates specify the computation rules, the template store is also called rule store. These rules can then be efficiently processed by the issuance program/smart contract(s). The proposed certification system solves the problem of limited expressiveness of existing certificate systems with respect to complex interrelationships between certificates, by allowing any combinations of arithmetic/Boolean functions when defining the computation rules. The system also improves transparency and enables automation during certificate issuance and verification.

Templates and metadata can be stored on Blockchain (i.e., Blockchain serves as the template store and metadata store), and the issuance/verification method can be implemented as smart contracts deployed on Blockchain. This way the templates and issuance/verification methods are publicly auditable (meaning anyone can view it to see if it is secure, correct, and bug-free), and the issuance/verification process is more secure, trustworthy, and decentralised. During issuance, user privacy is protected by returning the certificate (with sensitive information in it) to the requestor and storing only the metadata (without sensitive information) on Blockchain. By storing dependency information in certificate metadata during issuance, the system enables users to verify a certificate by tracing back the dependency tree of a certificate. Any third party with a certificate can request verification of that certificate using the verification program/smart contract(s) and that verification can consider part of or entire dependency tree.

A method for generating an output certificate comprises:
receiving a request for the output certificate, the request comprising a template identifier and data indicative of one or more dependency certificates;
querying a rules store for the template identifier to retrieve one or more dependencies associated with the template identifier and assertions on claims in relation to the dependencies;
testing the one or more dependency certificates from the request against the assertions;
upon determining that the one or more dependency certificates are valid and that the assertions are met:
creating a certificate entry on a certificate store associated with a certificate identifier;
setting the certificate entry to valid;
creating the output certificate including the certificate identifier;
calculating and storing a hash value on the certificate store; and sending the output certificate in a response to the request.

A method for issuing an output certificate, the method comprises receiving a request for the output certificate, the request comprising a template identifier and data indicative of one or more dependency certificates, and the output certificate comprising a set of attributes, wherein each attribute has a name and a value. The method further comprises for each of the one or more dependency certificates, checking that the dependency certificate relates to a previously issued certificate; and querying a rules store using the template identifier to retrieve a template. The template specifies one or more first attribute paths to first attributes in the output certificate. The template specifies that values of the first attributes are to be computed based on attributes from the dependency certificates. The template specifies a rule for computing an attribute value for each of the one or more first attribute paths. The method further comprises generating the output certificate based on the request and the template, by computing an attribute value for each of the one or more first attribute paths specified in the template, by applying the rule associated with that first attribute path on attribute values in the one or more dependency certificates; and including the computed attribute value for each of the one or more first attribute paths in the output certificate. The method further comprises sending the output certificate in a response to the request.

It is an advantage that the method incorporates dependencies and relies on templates providing computation rules to issue new certificate based on dependencies. This provides an expressiveness with respect to complex interrelationships between a potentially large number of certificates. Further, the method relies on a certificate metadata store including dependency information of each certificate. The advantage is that any third party can request verification of any certificate from the certificate store and that verification can consider the entire dependency tree.

In some embodiments, the template specifies one or more second attribute paths to second attributes in the output certificate, the template specifies that values of the second attributes are to be digitally signed by a trusted endorser and provided in the request, and the method comprises:
receiving an endorsement in the request comprising attribute values of the one or more second attribute paths specified in the template, an endorser identifier, and a digital signature associated with the attribute values generated by the endorser using a private key;
verifying the digital signature by querying a public key store with the endorser identifier to retrieve a public key associated with the private key, and verifying the digital signature based on the public key and the endorsement; and
upon successfully verifying the signature, including the endorsed attributes into the output certificate, by:
establishing a precedence order among first attributes and second attributes; and
including an attribute value of an attribute path in the output certificate by, upon determining that the attribute path has an existing attribute value filled by a previous step, determining the attribute value to include based on the precedence order.

In some embodiments, issuing the output certificate comprises:
querying a rules store on a Blockchain to retrieve the template;
querying a public key store on the Blockchain to retrieve the public key;

creating a metadata entry for the output certificate in a metadata store on the Blockchain, the metadata entry containing metadata of the output certificate;

implementing and executing the method for issuing an output certificate as one or more smart contracts deployed on the Blockchain; and applying a deterministic function on the request to obtain a unique certificate identifier for the output certificate.

In some embodiments, the method comprises:

specifying one or more metadata attributes to be included in the output certificate, the one or more metadata attributes being indicative of one or more of:
certificate identifier of the output certificate,
template identifier of the output certificate,
endorser identifier of the output certificate,
endorser signature of the output certificate,
one or more certificate identifiers of dependency certificates associated with the output certificate, and
hash value of the output certificate;

obtaining the template identifier of the output certificate from the request;

obtaining the certificate identifiers of dependency certificates by extracting certificate identifiers from the dependency certificates in the request;

obtaining the endorser identifier and signature from the endorsement in the request; and including the obtained metadata attribute values in the output certificate by:
establishing a precedence order among first attributes, second attributes and metadata attributes; and
including an attribute value of an attribute path in the output certificate by, upon determining that the attribute path has an existing attribute value filled by a previous step, determining the attribute value to include based on the precedence order.

In some embodiments, the template specifies schema of the attributes in the output certificate, the schema specifying, for each attribute path in the output certificate, a value type and a value range of attribute value associated with the attribute path, and the method further comprises checking that the output certificate satisfies the schema specified in the template, by checking that each attribute value in the output certificate is of the correct type and within the correct range.

In some embodiments, certificate metadata attributes are stored on a metadata store and non-metadata attributes are not stored on the metadata store, and the issuance method comprises:

creating a metadata entry in the metadata store, indexed by the certificate identifier of the output certificate; and saving the metadata attributes of the output certificate in the metadata entry.

In some embodiments, a computation rule of an attribute path specifies one or more template identifiers of dependency certificates associated with the attribute path, one or more dependency attribute paths for each of the one or more template identifiers of dependency certificates, and a function for computing an attribute value of the attribute path, where the function can be defined as a combination of arithmetic and logical functions on the attribute values of the one or more dependency attribute paths, and the issuance method comprises:

computing an attribute value of an attribute path with an associated computation rule by:
for each of the one or more template identifiers of dependency certificates specified in the computation rule, finding a dependency certificate with a matching template identifier from the one or more dependency certificates in the request, and extracting one or more attribute values from the dependency certificate using the one or more dependency attribute paths associated with the template identifier of dependency certificate;

obtaining one or more inputs for the function, by gathering the one or more extracted attribute values for each of the one or more template identifiers of dependencies; and applying the function specified in the computation rule on the one or more inputs to obtain the attribute value of the attribute path.

In some embodiments, the method further comprises:

checking that each of the one or more dependency certificates in the request relates to a previously issued certificate by:
calculating a hash value for the dependency certificate;
extracting a certificate identifier from the dependency certificate;
querying the metadata store using the certificate identifier to retrieve a metadata entry; and
comparing the calculated hash value against the hash value in the metadata entry retrieved from the metadata store; and
calculating a hash value of the output certificate and including the hash value in the metadata attributes of the output certificate.

In some embodiments, the template specifies attribute paths of endorsed attributes implicitly.

In some embodiments, the rule for computing the attribute from the rules store comprises porting attributes from the one or more dependency certificates into the output certificate.

In some embodiments, the rule for computing the attribute from the rules store comprises an assertion on attribute values of the one or more dependency certificates.

In some embodiments, the template comprises the template identifier.

A method for verifying an input certificate comprises:

receiving input data indicative of the input certificate to be verified, the input certificate being identified by a certificate identifier;

querying a metadata store using the certificate identifier to retrieve a metadata entry associated with the certificate identifier;

determining that the input certificate relates to a previously issued certificate by calculating a hash value of the input certificate and comparing to a hash value in the metadata entry;

retrieving one or more dependency certificate identifiers associated with the certificate identifier from the metadata entry;

determining that the one or more dependency certificate identifiers relate to valid dependency certificates by querying the metadata store to retrieve their metadata; and upon determining that the one or more dependency certificate identifiers relate to valid dependency certificates, responding with a success message.

In some embodiments, the method further comprises, upon identifying a failure in validating the input certificate, responding with a failure message.

In some embodiments, the method comprises recursively determining a validity of further certificates referenced by further dependency certificate identifiers in the metadata of dependency certificates.

In some embodiments, verifying the input certificate comprises querying a metadata store on a Blockchain, and implementing and executing the verification method as one or more smart contracts deployed on the Blockchain.

Software, when executed by a computer, causes the computer to perform the above method.

A certificate computer system comprises:
- a rules store configured to store, associated with a template identifier:
  - one or more template identifiers of dependency certificates,
  - one or more attribute paths, and
  - functions to compute one or more output certificate attributes from one or more attributes of the dependencies;
- a certificate metadata store configured to store, associated with the template identifier and a certificate identifier:
  - a validity state,
  - one or more certificate identifiers of dependency certificates, and
  - a hash value;
- a processor configured to generate a certificate by:
  - receiving a request for the output certificate, the request comprising a template identifier and data indicative of one or more dependency certificates;
  - querying a rules store using the template identifier to retrieve a template associated with the template identifier;
  - computing a value for each of the one or more computed attributes by applying a function from the rules store on attribute values of the one or more dependency certificates;
  - creating the output certificate including the computed value for each of the one or more computed attributes; and
  - sending the output certificate in a response to the request;
- the processor being further configured to verify an input certificate by:
  - receiving input data indicative of the input certificate to be verified, the input certificate being identified by a certificate identifier;
  - determining that the input certificate relates to a previously issued certificate by calculating a hash value of the input certificate and comparing to a hash value stored on a certificate metadata store;
  - querying a metadata store to retrieve one or more certificate identifiers of dependencies associated with the certificate identifier; and
  - upon determining that the one or more certificate identifiers of dependencies relate to valid dependency certificates, responding with a success message.

Depending on the use case, the computation rules can be any combinations of arithmetic/logical functions, ranging from simply copying/porting values to complex computations. Those computation rules/functions will be applied to dependency certificates during issuance, to compute the computed attributes of a new certificate. In some embodiments, creating the output certificate comprises porting attributes from the one or more dependency certificates into the output certificate.

In some embodiments, the method is performed by a central server that maintains the template store and the certificate metadata store.

In some embodiments, the output certificate comprises a subject entry and the method comprises migrating subject entries from the one or more dependency certificates into the output certificate.

In some embodiments, each of the computation rules comprises:
- a list of (template identifier, attribute path) pairs, which, during the issuance process, will be used to extract relevant attribute values from the dependency certificates provided in the certificate request. The extracted values serve as inputs to the computation function.
- a function that works on a list of inputs to produce an attribute value. To achieve a criterion check on a dependency certificate, the function may be configured to return a Boolean value to indicate whether the assertion is met.

Depending on the use case, sometimes not all attributes can be computed during issuance. For the attributes that cannot be computed, the disclosed methods allow a certificate requestor to provide values of those attributes directly, as long as those values are endorsed by an endorser trusted by the system. The category of each attribute (computed or endorsed) is specified in the template. Note that endorser is a trusted authority. Therefore, by allowing endorsed attributes, the disclosed methods remain backward-compatible with the traditional trust model. In some embodiments, the request comprises an endorsement, which includes attributes (path and value) and a signature; and the method comprises verifying that the signature is a valid signature for the attributes. Public keys of all trusted endorsers are stored in a public key store, which the issuance program can access in order to verify the signature during issuance.

In some embodiments, the output certificate comprises one or more of subject entries and claims from the dependency certificates received with the request.

In some embodiments, the output certificate comprises the template identifier.

In some embodiments, querying the rules store for the template identifier comprises selecting one of multiple templates from the rules store; and the multiple templates comprise a child template that extends a corresponding parent template by inheriting attributes from the parent template.

In some embodiments, the certificate metadata store stores a history of changes to the certificate entry.

In some embodiments, the template store, certificate metadata store, and public key store are formed by a blockchain, and the issuance and verification methods are implemented as smart contracts, which are deployed on the Blockchain.

A method for verifying an input certificate comprises:
- receiving input data indicative of the input certificate to be tested, the input certificate being identified by a certificate identifier;
- determining that the input certificate is identical to a previously issued certificate by calculating a hash value of the input certificate and comparing to a hash value stored on a certificate store;
- querying a rules store to retrieve one or more dependencies associated with the certificate identifier; and
- upon determining that the one or more dependencies relate to valid dependency certificates, responding with a success message.

In some embodiments, the method further comprises, upon identifying a failure in validating the input certificate, responding with a failure message.

In some embodiments, querying the rules store comprises: querying the certificate metadata store for the certificate identifier to retrieve a template identifier; and querying the rules store for the template identifier to retrieve the template identifiers of dependencies.

In some embodiments, the method comprises recursively determining a validity of further certificates referenced by further dependencies in the dependency certificates.

Software, when executed by a computer, causes the computer to perform the above method.

A certificate computer system comprises:
a rules store configured to store, associated with a template identifier:
one or more dependencies, and
assertions on claims in relation to the dependencies;
a certificate store configured to store, associated with the template identifier and a certificate identifier:
a validity state, and
a hash value;
a processor configured to generate a certificate by:
receiving a request for an output certificate, the request comprising the template identifier and data indicative of one or more dependency certificates;
querying the rules store for the template identifier to retrieve one or more dependencies associated with the template identifier and assertions on claims in relation to the dependencies;
testing the one or more dependency certificates from the request against the assertions;
upon determining that the one or more dependency certificates are valid and that the assertions are met:
creating a certificate entry on the certificate store;
setting the certificate entry to valid;
creating the output certificate; and calculating and store the hash value of the output certificate; and
sending the output certificate in a response to the request;
the processor being further configured to test an input certificate by:
receiving input data indicative of the input certificate to be tested, the input certificate being identified by a certificate identifier;
determining that the input certificate is identical to a previously issued certificate based on the hash value stored on the certificate store;
querying the rules store to retrieve one or more dependencies associated with the input certificate; and
upon determining that the one or more dependencies relate to valid dependency certificates, responding with a success message.

BRIEF DESCRIPTION OF DRAWINGS

An example will now be described with reference to the following drawings.

DESCRIPTION OF EMBODIMENTS

Figure 1:
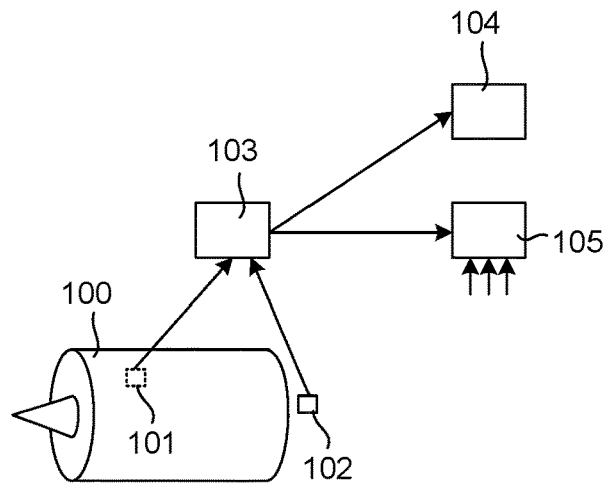
FIG. 1 illustrates an example industrial internet of things (ToT) application.

This disclosure provides a certificate issuance process that is handled by an issuance program. This automates the issuance process and makes it real-time.

The issuance process of a certificate starts once the system receives a certificate request. The request comes from a user (also called certificate requestor) in need of a certificate. This is so that the requestor has the right to determine when the certificate is issued.

The template identifier in the request points to a template in the template store (the template contains information about how the certificate should be issued). This is so that the certificate requestor has the right to determine the type of the certificate and how the certificate is issued.

The dependency certificates are provided in the request, instead of loaded from a store inside the system. Since the system store is public, providing the dependency certificates in the request means that the system does not store any certificate attributes that may contain sensitive information. Only the metadata of certificates are stored in the metadata store, which does not contain sensitive information, therefore user privacy is protected. This is also to ensure the requestor has already obtained all the required dependency certificates before the issuance.

Modelling certificate as a set of (nested) attributes makes the system flexible and domain-independent. The attribute names, paths, and their value types and ranges are defined by the schema in the template. In other words, by specifying the template identifier in the request, the requestor is also specifying the expected format/structure of the certificate in need.

Among the attributes of a certificate, some of them are categorised as computed attributes. Their values are automatically computed by the issuance program during issuance. It is noted that the computed values are not supported/endorsed by an authority, and thus are not digitally signed. This is because in the disclosed trust model, the issuance program itself is trusted (not the party that runs it).

When the issuance program is run as smart contracts on Blockchain, the trust on the issuance program comes from the fact that 1. the program (i.e. the code) is publicly auditable (meaning anyone can view it to see if it is secure, correct, and bug-free), 2. the consensus mechanism of Blockchain ensures the program is always executed as written.

The template specifies which attributes are computed attributes, and also specifies their corresponding computation rules. A computation rule defines how an attribute should be computed from other attributes in dependency certificates. This allows the system to achieve dependency-aware certificate issuance. It is noted that when a computation rule specifies a relevant dependency, it specifies the template identifier of that dependency, instead of a specific certificate identifier. This is because any certificate of that template is eligible to be provided as a dependency in the request. For example, a degree certificate depends on a valid student ID. Then a degree certificate for Alice will definitely depend on a different student ID from what Bob's degree certificate depends on. In this case, any certificate can be provided as an eligible dependency in the request for a degree certificate, as long as the certificate is based on the student ID template.

The dependency certificates in the request are checked during issuance, to ensure they are indeed certificates previously issued by the issuance program. The check is done by checking if every dependency match one of the records in the metadata store. The metadata of a certificate may store the hash of the certificate to facilitate this check. This check prevents the requestor from providing corrupted dependency certificates that mislead the issuance program.

The issuance program does not change for different certificates, it only loads/retrieves different templates and dependency certificates based on the request. This allows the system to be flexible while keeping the issuance program unchanged. This is particularly important when the program is implemented as smart contracts, because it is difficult to update smart contracts after deployed on Blockchain.

The output certificate (all attributes) is returned to the requestor immediately after issuance (i.e., real-time issuance). Only the metadata of the certificate is stored in the system (in the metadata store) for privacy protection. It is noted that the metadata is also included in the returned certificate, as an attribute with a reserved attribute path.

Computed attributes transfer trust from an authority to the issuance program, which is a novel trust model. But considering in some use cases, not all attributes are computed based on dependencies, the system is designed to be backward-compatible with a trust model where a trusted authority endorses attributes in a certificate, by digitally signing the attribute values. Those attributes are called endorsed attributes. Like computed attributes, endorsed attributes are also specified in the template. It is noted that the specification may be explicit (enumerating all the endorsed attributes) or implicit (assuming endorsed attributes are those that is neither metadata nor computed).

Paths and values of endorsed attributes are provided in the request. This part of the request is called an endorsement. It is noted that the endorsement must contain an endorser identifier and a signature of that endorser. To verify that signature during issuance, the system has a public key store accessible to the issuance program, which stores the public key of all trusted endorsers, indexed by the endorser identifier.

It is noted that when generating the output certificate, a computed attribute may be mistakenly provided as an attribute in the endorsement. This is a mistake or malicious act of the requestor because the requestor does not follow the specification in the template when constructing the request. The issuance program may remain robust and recover from such a user mistake by defining precedence order between endorsed attributes and computed attributes. For example, the computed attributes can be added after the endorsed attributes during issuance and they overwrite any mistakenly provided attributes in the endorsement (in this case, the computed attributes take precedence over endorsed attributes).

Template store, metadata store, and public key store may be hosted on Blockchain, and the issuance program may be implemented and run as smart contracts on Blockchain. This enables a novel trust model of digital certification, where the issuance program itself is trusted (not the party that runs it). When the issuance program is run as smart contracts on Blockchain, the trust on the issuance program comes from the fact that 1. the program (i.e. the code) is publicly auditable, 2. the consensus mechanism of Blockchain ensures the program is always executed as written.

Data used by the issuance program are also trustworthy: templates on Blockchain are publicly auditable and immutable; metadata on Blockchain are written by the trusted issuance program and is also immutable; the trust on endorser public keys are inherited from the trust on endorsers and Blockchain provide immutability on those public keys. At the system level, a trusted issuer digital certification system has an "issuer" actor, who is trusted and is responsible for issuing certificates. In the system disclosed herein, there is no "issuer" actor, the issuance process is handled by smart contracts on Blockchain. For comparison, the "issuer" actor is deconstructed into three actors in our system, namely template designer, endorser, and certificate requestor. In other words, the "issuer" in a trusted issuer system is simultaneously a template designer, an endorser, and a certificate requestor in the system disclosed herein. In that sense, the disclosed system is compatible with a trusted issuer trust model and can be used to realise the function of such digital certification systems, but it enables a novel trust model where there is no trusted "issuer". It is noted that template designers do not need to be trusted, because the templates are publicly auditable, so anyone can publish a template, with a possibility to be widely adopted.

When the issuance program is run as one or more smart contracts, the program takes special care when generating a unique identifier for a certificate. Previously, an issuance program can use a random identifier generator (e.g. uuid version 4 protocol) to obtain a unique identifier. But since smart contracts are run by multiple machines in a decentralised manner, and their results reach a consensus, therefore the issuance program itself is deterministic and does not carry any randomness, otherwise, the multiple machines may not reach a consensus on the generated identifier. As a result, the randomness can be injected from external, for example, by the request. The issuance program can then run a deterministic function (e.g. hash function) based on the request to obtain a unique certificate identifier. For example, the request may contain a random number and the issuance program may hash the request to obtain a unique certificate identifier.

Certificates may contain metadata at a reserved attribute path, and metadata contain but not limited to the following sub-attributes:
- a unique certificate identifier, used to index the metadata store;
- a template identifier, used to indicate the template this certificate is based on, and used to pinpoint the relevant dependency certificates in the request when computing the computed attributes during issuance.
- an endorser identifier and a signature, whose values may be empty if there is no endorsed attributes.
- certificate identifiers of all dependencies, used to trace back the dependency tree during certificate verification.

The values of metadata attributes are added during issuance. It is noted that due to a mistake or a malicious act of template designers or certificate requestors, sometimes a metadata attribute may be specified as a computed attribute in the template, or provided as an endorsed attribute in the endorsement in the request. The issuance program may remain robust and recover from such mistakes by defining precedence order between metadata and other attributes. For example, metadata can be added after other attribute values and they overwrite any mistakenly provided/computed attributes (in this case, metadata take precedence over computed and endorsed attributes).

Metadata store is used as the source of truth when checking a certificate was indeed issued by the system, and is used to trace back the dependency tree of a certificate during certificate verification. It may also be used to record/check whether a certificate is valid or has been revoked.

Specifying the schema in the template and performing a schema check during issuance realise the following purposes:
- allows the flexibility to represent certificate in different domains/use cases.
- allows the requestor to determine the structure/format of the certificate in need.
- ensures the output certificate is in correct format (e.g. if the requestor forgot to include an attribute in the endorsement in the request, the schema check will catch that error, because the generated certificate in this case will miss one attribute).
- along with computation rules, achieves automated criterion/condition check on dependency certificates. For example, when issuing a certificate requires to check a person's age is over 18, a computed attribute and a corresponding computation rule can be defined to output a true value (a Boolean value) when the age attribute in a ID certificate (the dependency certificate) is greater than 18, and the schema can be defined to limit the type of the computed attribute value to Boolean and limit its range to "true" (a discrete, single-value range).
- since schema also covers the data types and ranges of metadata attributes, it enables checks on metadata. For example, a template may specify a whitelist of endorsers in the schema (in this case, the endorser identifier attribute in the metadata is of type "Enum", which can enumerate all allowed endorser identifiers), which empowers the requestor to choose his/her desired endorser.

Returning the full certificate to the requestor and storing only the metadata in the system protects user privacy. It is noted that the metadata does not require to include any sensitive information from the certificate to achieve its functionality.

Computation rules in the template may be specified as a function and its inputs. The function can be any combination of arithmetic and/or logical functions, which enables the expressiveness of complex inter-certificate relationships.

When checking that a dependency certificate is indeed issued by the system during issuance, or checking the validity of a certificate during verification, hash comparison may be used. The hash of the output certificate can be computed and stored in the metadata during issuance. The issuance/verification program can query the metadata store for the hash of a certificate to compare. This enables a privacy-preserving way to check the existence of an issued certificate, because hash in the metadata store doesn't reveal any sensitive information.

Templates may specify which attributes are endorsed attributes implicitly. For example, the system may assume that all attributes that are neither metadata nor computed are considered as endorsed attributes during issuance.

Similar to issuance, certificate verification is handled by a verification program, and therefore is automated and real-time. Verification is also dependency-aware by recursively expanding the dependency tree of a certificate using the information in metadata store. When implemented and run as smart contracts on Blockchain, the verification program is not controlled/run by any single trusted authority, the Blockchain network collectively run the verification program in a trustworthy, decentralised manner. The trust on the verification program comes from the fact that 1. the verification program is publicly auditable, 2. the consensus mechanism of Blockchain ensures the program is always executed as written. The data used by the verification program are also trustworthy, because the information in metadata store are written by the trusted issuance smart contracts, and Blockchain ensures the metadata store is immutable/tamper-proof.

At the outset, it is noted that the abovementioned certificates for providing public keys are just one example of certificates. In this disclosure, certificates are understood more broadly as a digitally verifiable dataset. A certificate contains a set of attributes, attributes are key-value pairs (attribute=attribute name+attribute value). Attributes can be nested key-value pairs: An attribute can contain sub-attributes. (Unless stated otherwise, the word "attribute" in this patent also refers to sub-attribute). As a result, each attribute can be addressed by an attribute path and may follow a JavaScript Object Notation (JSON) format.

In some examples, an attribute represents an assertion on one or more dependency certificates, which is also referred to as a claim. The claim is typically verified by the issuance program during issuance based on the computation rule and schema of that attribute. Such a computation rule can be a logical expression that returns a Boolean value or can take other forms. The issuance program can be run by a central and trusted server. Some examples in this disclosure rely on a central and trusted server, which means that this server is accessible by the parties involved in the certification, which in most cases means the server is publically accessible and provides stored data in a form that is readable to the public (such as third party computer systems). The trusted server may authenticate itself by way of private/public key certificates as described above. In some examples, such a publicly accessible data store can also be implemented as a distributed blockchain.

It is further noted that certificates are an important part of computer networks in the sense that certificates enable trusted communications. For example, in an internet of things (IoT), it is difficult for devices to determine whether a neighbour device in the network is a genuine device or provides false data intentionally to hack the network. Often, one IoT device relies on a chain of other devices to provide and aggregate data that is finally provided on the edge of the network.

FIG. 1 illustrates an example industrial application comprising a turbine 100, a first internal temperature sensor 101, a second exhaust temperature sensor 102, a mechanical load monitor 103, a plant monitor 105 and a vehicle controller 104. The sensors 101/102 sample the temperature at their location and send the measurement data to mechanical load monitor 103, which measures mechanical load, such as vibrations, of the turbine 100. The load monitor 103 then sends messages about the turbine operation to a vehicle controller 104, which generates output signals to control a vehicle, such as a helicopter, and a plant monitor 105 which monitors various further aspects of the power plant in the vehicle.

As can be seen in FIG. 1, there are a number of pathways from the turbine 100 to the vehicle controller 104 and the plant monitor 105 and it is desirable to design the network of FIG. 1 as in IoT network to reduce configuration overhead and easy of re-configuration. However, in an IoT environment, it is difficult for the vehicle controller 104 for example, to verify that the load monitor 103 performed correctly in determining that temperature measured by the sensors 101 and 102 are within their nominal ranges. Instead, it is possible that a faulty load monitor or a modified lead monitor claims to have received a nominal temperature but in fact, the temperature is outside the nominal range.

Another example would be a cattle farm where animals are scattered over a large area and data communication is difficult from a central server to sensors on the animals. In those cases, the data can be processed at multiple edge nodes or forwarded by different sensor nodes. However, it is difficult to determine the authenticity of that data. This problem is referred to as a problem of trust within the IoT, so as to determine whether the received data is authentic or not and this disclosure provides an architecture for certificate generation that establishes trust between IoT devices or other entities based on a publicly assessable data store, such as a server or a blockchain.

As mentioned above, certificates comprise attributes, such as assertions or claims about the certificate itself (e.g., expiration date), assertions about the endorser (e.g., is authenticated or registered), or assertions about a specified subject (e.g., temperature is within nominal range or a machine has been serviced). An important further aspect is that attributes/assertions often rely on other entities or other claims. In the proposed certificate architecture, this reliance or dependency is represented by a dependency on certificates. So a particular certificate may depend on another certificate. Those certificates on which other certificates depend are referred to as dependency certificates.

A dependency relationship is established when an attribute (in a certificate) is computed based on another attribute in another certificate. Therefore, the specification of that dependency is also referred to as computation rule, or simply "rule". During the issuance process, the value of an attribute with an associated computation rule will be computed accordingly, and such an attribute is called computed attribute. During the issuance, the computed value may go through a schema check before an output certificate is generated, which checks the value is of the correct type and is in the correct range (either continuous or discrete). This way the disclosed method supports flexible, automated criteria check.

For example, when issuing a certificate requires to check a person's age is over 18, a computation rule can be defined to output a true value (a Boolean value) when the age attribute in a ID certificate (the dependency certificate) is greater than 18, and the schema can be defined to limit the type of the computed attribute value to Boolean and limit its range to "true" (a discrete, single-value range). In that sense, the computation rules, along with the schema, specify what is required in terms of the dependency certificates to issue/validate a particular certificate.

To further simplify the generation of certificates and provide flexibility, there are templates that govern the issuance of certificates and encapsulate the certificate schema and the individual computation rules on dependency certificates. In other words, a template specifies the schema of a certificate (including all the attribute names/paths, and their type and range), and has a list of computed attributes and their corresponding computation rules and once all the computation rules generate values that satisfy the schema, the output certificate corresponding to that template is generated/issued.

A template may specify multiple computed attributes among the attributes defined in the schema, and a computation rule of a computed attribute may refer to multiple dependency templates and attributes. Even further, the metadata store may store the status of each certificate. In particular, the status indicates whether the certificate is valid or has been revoked. As a result, a third party that has been given a certificate, can contact the certificate metadata store to verify that the received certificate is valid. In the course of that check, the third party can also check that all the dependency certificates are still valid. This enables an efficient hierarchical checking of large trees of certificates that would be difficult with standard public key certificates or chains of trust.

This disclosure provides a digital certification system that supports customisable certificate issuance and rules based on certificate dependency declarations to enable automatic certificate verification by traversing its dependency tree. The system may consist of:
  a) an object-oriented certificate template model that allows a template to inherent attributes from another template, enabling dependency polymorphism during certificate generation;
  b) a rule-based certificate generator that, once loaded with computation rules, can generate new certificate from a set of existing certificates by computing attribute values according to the rules;
  c) a tree-based certification state/metadata store that securely persists records for every certificate issuance attempt and facilitates dependency tree traversal during certificate verification.

The disclosed system can improve transparency and efficiency of certificate issuance by explicitly defining computation rules at design time and automating certificate generation with the rule-based generator at run time, while offering great flexibility with the object-oriented template model. The system also enhances trust and security of digital certificates by allowing third parties to verify each claim in a certificate via tracing back its dependency tree and verifying all its dependent certificates at runtime.

The proposed certification system solves the problem of limited expressiveness of existing certificate systems, by allowing users to describe structures within (using schema in template) and between certificates (using computation rules in template), as well as combine/reuse existing certificates for the generation of new certificates, improving transparency of certificate generation and enabling automation. By storing dependency information and other certificate metadata during issuance, the system allows users to verify a certificate by tracing back the dependency tree of a certificate and inspecting intermediate certificates, or re-applying computation rules to rebuild the dependency tree, which enhances trust and security. When integrated with Blockchain, the system can eliminate the need for certificate issuers, because the issuance/verification process can be fully automated and implemented as smart contracts on Blockchain. This way users do not put trust in an "issuer", but trust the smart contracts (i.e. the issuance/verification program) instead. The trust is based on the facts that 1. The smart contracts are publicly auditable. 2. The consensus mechanism of Blockchain ensures the smart contracts are always executed as written. Note that there is no single party that controls the execution of the smart contracts, which means there is no single point of failure. The Blockchain network collectively executes the issuance/verification smart contracts in a decentralised, trustworthy manner.

A certification process consists of two stages: (a) the design time and (b) runtime. At design time, certification templates are designed by template designers, and saved in the template store. When designing a new digital certificate for a new product (service), the designer may refer to the existing certificates/templates by inheriting/reusing some of the attributes and/or claims in these certificate templates like object-oriented programming. The designer can also define a claim that depends on one or more the existing certificates deployed and used in the system. At runtime, a client can request a certificate issuance of a specific template, providing the dependency certificates as part of the request. The client can verify not only if the certificate is issued by the issuance program by checking with the metadata store, but also all claims in the certificate by tracing back all its dependent certificates at runtime.

Figure 2:
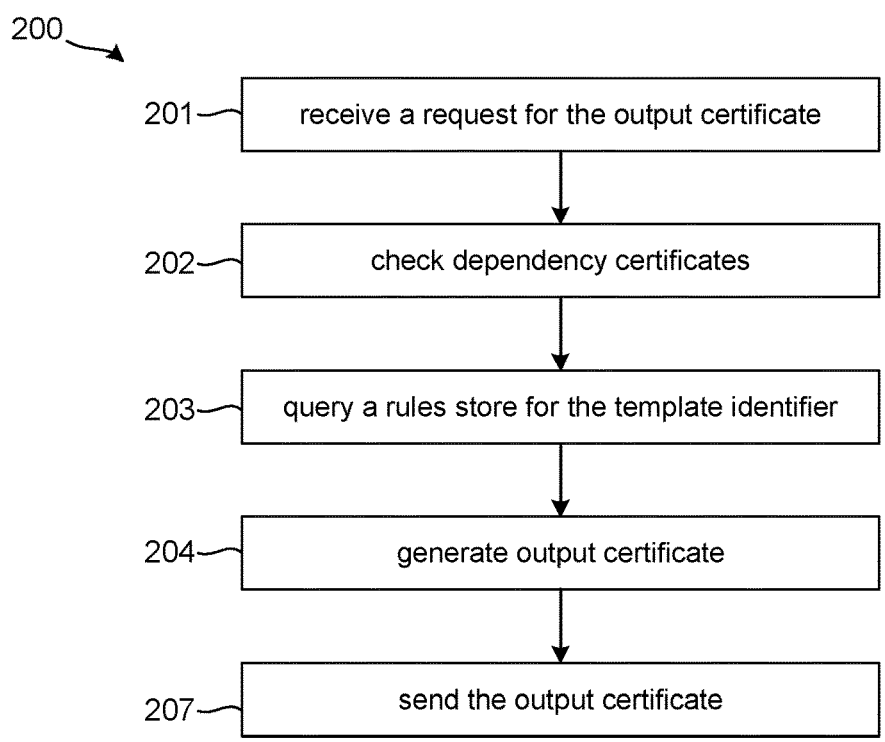
FIG. 2 illustrates a method for issuing an output certificate.

FIG. 2 illustrates a method for issuing an output certificate, which depends on a number of dependency certificates. It is noted that method 200 is explained with reference to a building inspection by accredited human inspectors but method 200 is equally applicable to IoT and other applications, such as in FIG. 1, which do not rely on human interaction. Method 200 can be performed by a central and trusted certificate server as set out above or an a Blockchain. It is further noted that an output certificate can be a simple text file that states in human-readable plain text, what the details and claims of the certificate are. In other examples, the certificate is encoded and/or only machine readable or formatted as practical, such as XML or JSON.

Figure 3:
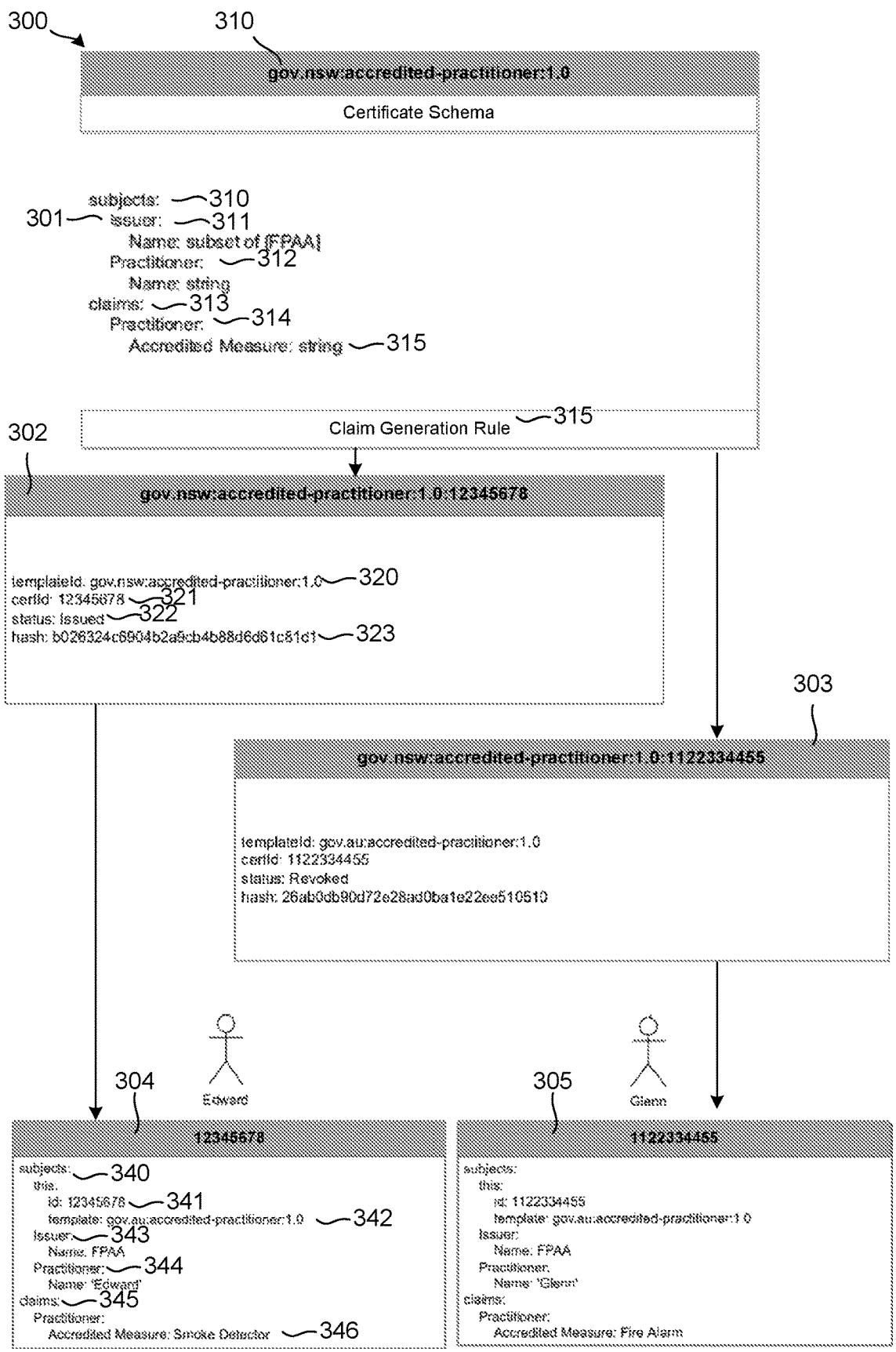
FIG. 3 illustrates a process for generating dependency certificates.

FIG. 3 illustrates a process for generating the dependency certificates which are then used in the method in FIG. 2. FIG. 3 shows a certificate template 301, which is used twice to generate two respective certificates. For each certificate, the server creates an entry 302 and 303, respectively in the certificate state store and generates certificates 304 and 305, respectively. The server then sends certificates 304 and 305 to the certificate holders in tangible form, such as a text file.

Template 301 comprises a template identifier 310 and fields for the subjects 311, including issuer 311 and practitioner 312. The template 301 further provides fields for claims 313, such as for the practitioner subject 314 and a claim of accredited measure 315. In this example, the certificates do not depend on dependency certificates. Therefore, there is no entry in the claim generation rule 316 in template 301.

Entry 302 in certificate store comprises fields for template identifier 320, certificate identifier 321, certificate status 322 (which can indicate 'issued', 'revoked', etc.) and a hash 323. Second entry 303 has the same fields because it is derived from the same template 301 but with different values.

The actual certificate provided to the practitioner, such as certificate 304 issued to Edward, comprises fields for subjects 340 including certificate identifier 341, template identifier 342, issuer 343 and practitioner 344. Further, the certificate 304 comprises fields for claims 345, which is here an accredited measure 346 for the practitioner defined under subjects. It is envisaged that fields for subjects, claims, template identifiers, certificate identifiers, status and has values remain the same for most applications. The remaining fields, such as practitioner and accredited measure are likely to be different in other applications, such as IoT machine control and monitoring. In the following description of method 200, certificates 304 and 305 are now referred to as dependency certificates.

In particular, the server receives 201 a request for an output certificate. The request comprises a template identifier and data indicative of one or more dependency certificates. The output certificate comprises a set of attributes, wherein each attribute has a name and a value. The method then checks 202, for each of the one or more dependency certificates, that the dependency certificate relates to a previously issued certificate.

Next, the server queries 203 a rules store using the template identifier to retrieve a template. The template specifies one or more first attribute paths to first attributes in the output certificate. Further, the template specifies that values of the first attributes are to be computed based on attributes from the dependency certificates. Also, the template specifies a rule for computing an attribute value for each of the one or more first attribute paths.

Figure 4A:
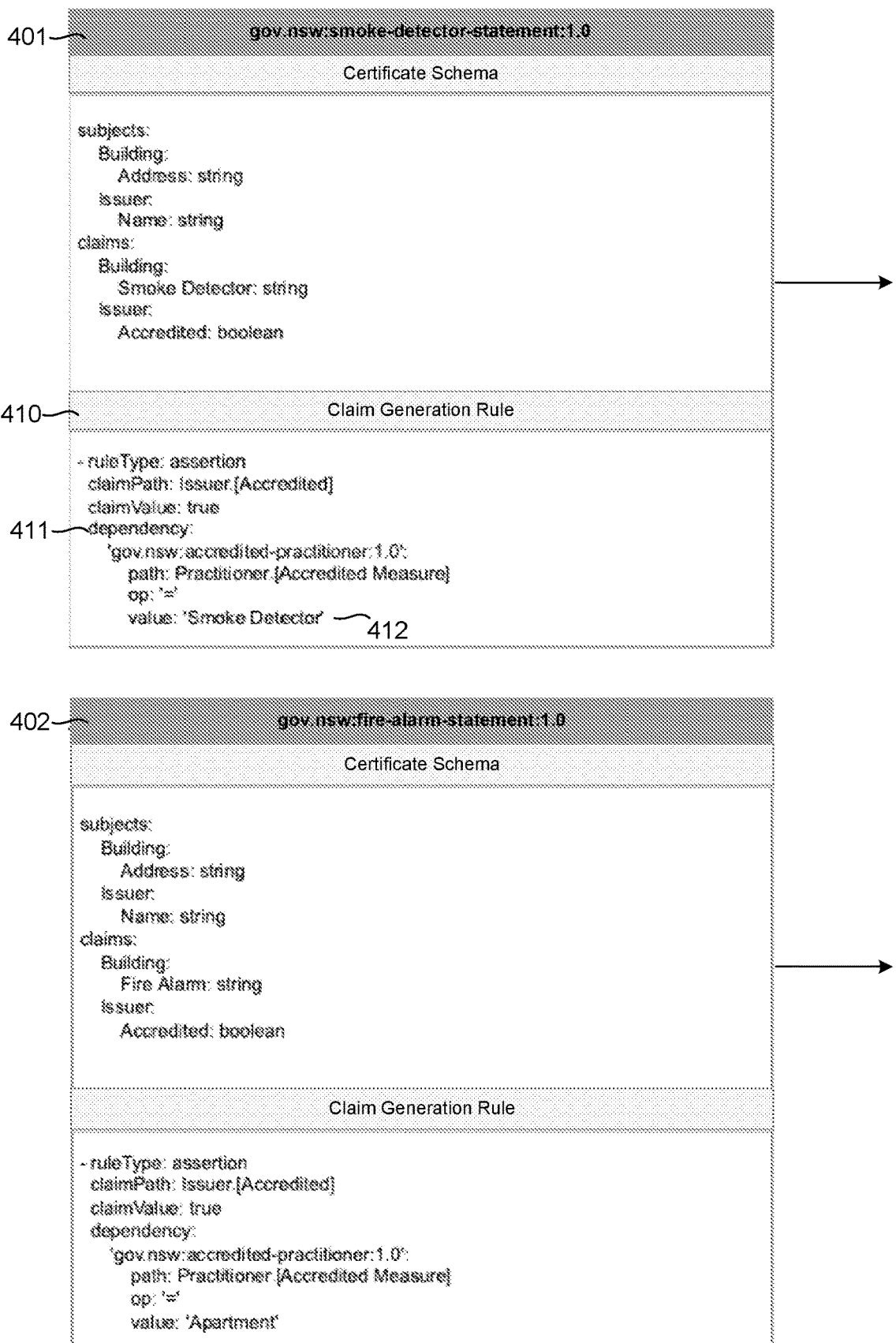
FIG. 4a illustrates part of a rules store.

FIG. 4a illustrates part of the rules store that stores a smoke detector template 401 and a fire alarm template 402. Again, both templates 401, 402 comprise fields for subjects, which is a building in this example, and claims attributes to indicate that the smoke detector and fire alarm have been checked, respectively. In contrast to template 301 in FIG. 3, template 401 comprises a claim attribute computation rule, which defines an assertion of the accredited value of an issuer to be true. The rule also defines a dependency at 411 on the template 301 including a test for the value of the accredited measure field at 412. Fire alarm template 402 comprises similar fields but for a fire alarm.

The method then generates 204 the output certificate based on the request and the template. The output certificate is generated by computing an attribute value for each of the one or more first attribute paths specified in the template, by applying the rule associated with that first attribute path on attribute values in the one or more dependency certificates. Generating the output certificate also comprises including the computed attribute value for each of the one or more first attribute paths in the output certificate.

Finally, the method comprises sending 207 the output certificate in a response to the request.

In one example, (not shown in FIG. 2) the rule directs the server to test the one or more dependency certificates from the request against the assertions. Here, the assertion is that the accredited claim value is true and as can be seen at 346 in FIG. 3, the accredited measure matches the requirement in the rule for smoke detector.

Figure 4B:
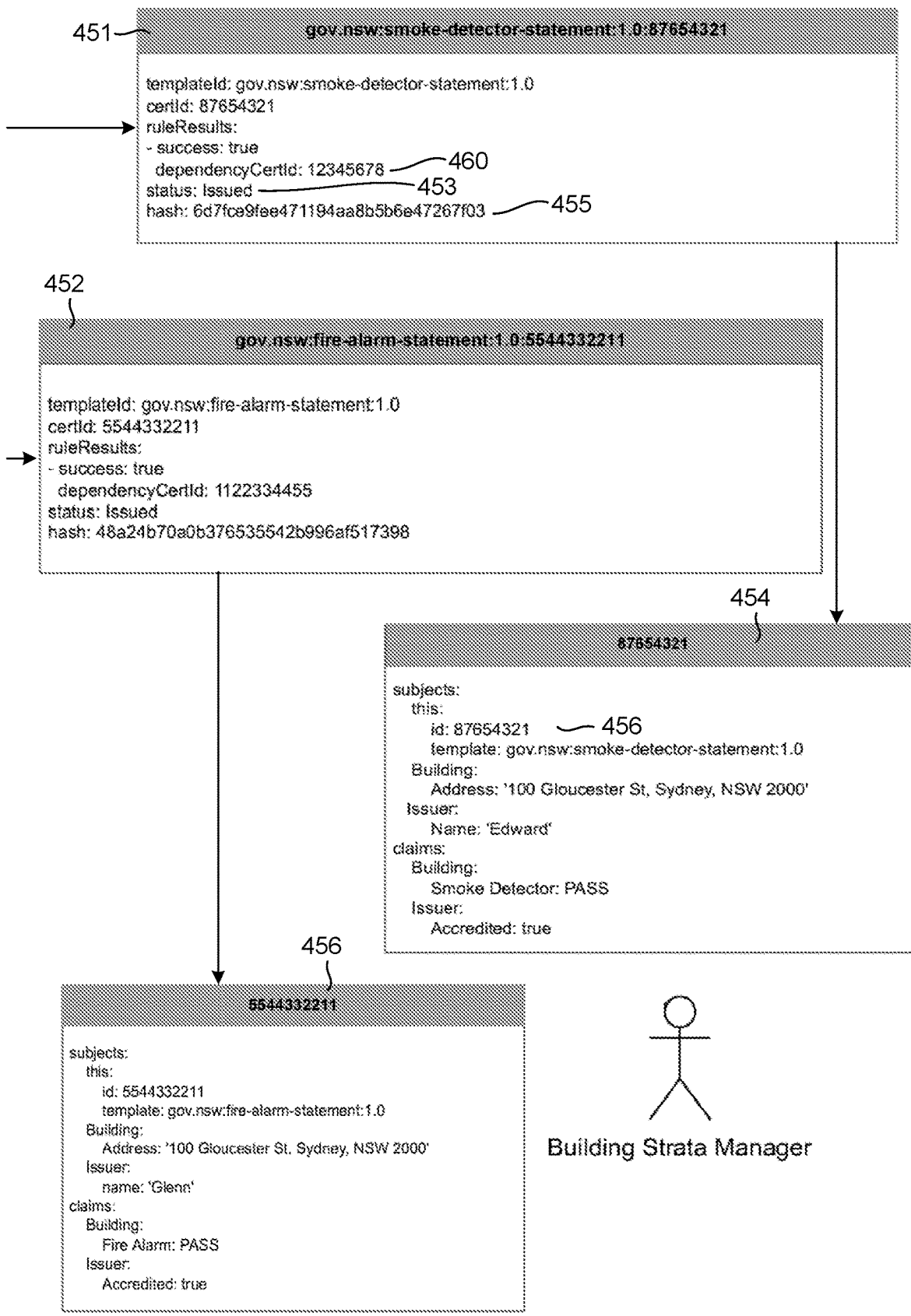
FIG. 4b illustrates entries stored on a certificate store and output certificates.

Upon determining that the one or more dependency certificates (304,305) are valid and that the assertions 412 are met, the server generates the output certificate which may comprise creating a certificate entry on a certificate/metadata store associated with a certificate identifier. FIG. 4b illustrates the corresponding entries 451 and 452 as stored on the certificate/metadata store. As can be seen, each entry comprises a template identifier, a certificate identifier, rule results, dependency certificate identifiers, status and hash value.

Still under the condition that the assertions are met, the server may set the certificate entry to valid as shown by "status: issued" at 453, calculates and stores the hash value 455 on the certificate store and sends the output certificate 454 in a response to the request. Similarly, the server creates a second output certificate 456 with a similar structure but different values.

It can be seen that the output certificate 454 comprises a certificate identifier 456, so a third party receiving the output certificate 454 can query the certificate store by the certificate identifier 456 to retrieve the corresponding entry 451, which indicates the status of the output certificate 454. The server, in checking the output certificate 454 calculates the hash of the output certificate 454 and compares the result against the stored hash 455. If both match, the server returns the status 453, and if they do not match, the server returns an error message.

Importantly, entry 451 also comprises a field for dependency certificate identifier 460, which the server can also return. This enables the third party to again query the server to check the validity of the dependency certificate, which is shown in FIG. 3 at 304.

Figure 5:
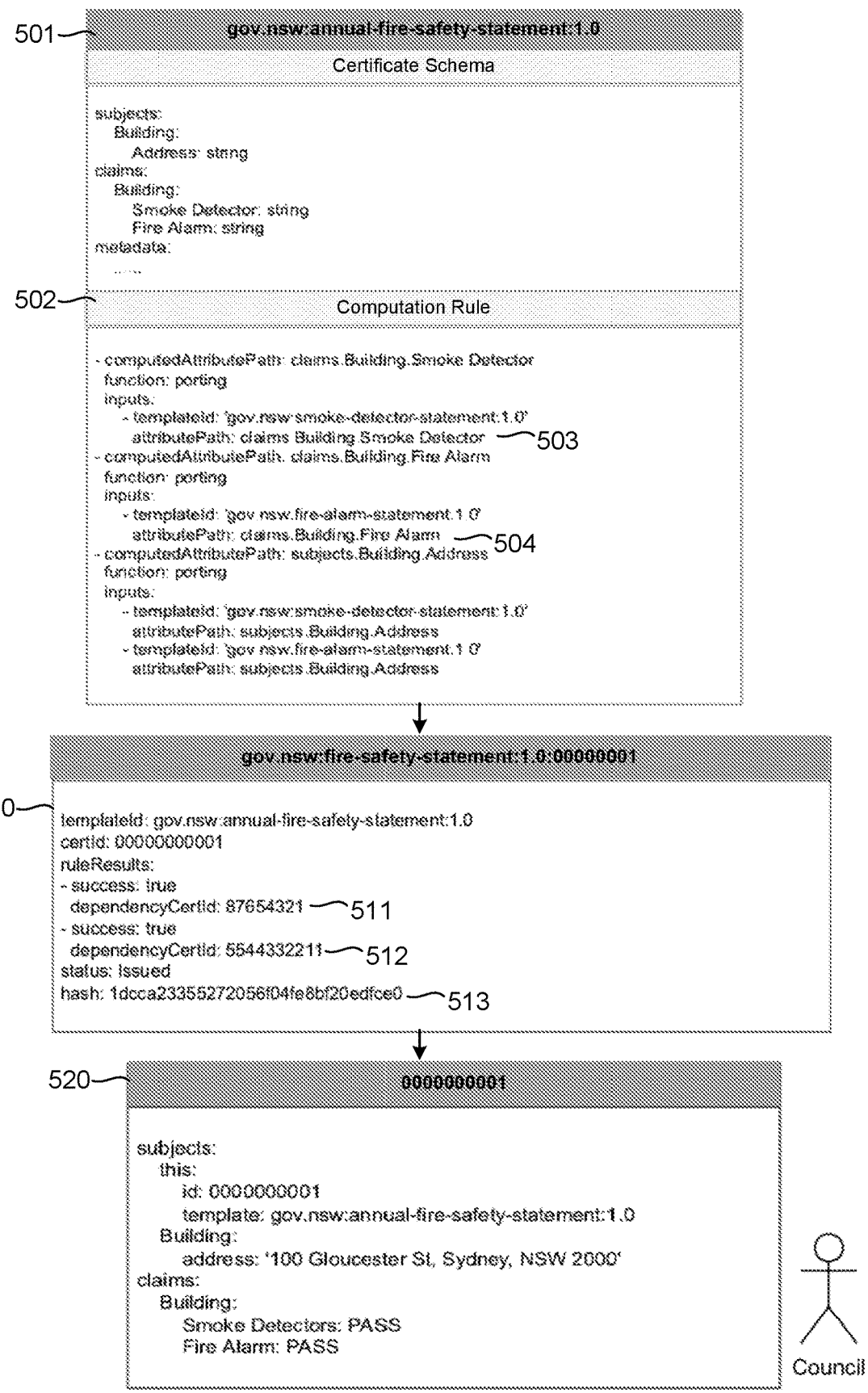
FIG. 5 illustrates another example of generating an output certificate.

FIG. 5 illustrates yet another example, where now the certificates 454, 456 shown in FIG. 4b are used as dependency certificates. So the server again receives a request for an output certificate and this time, the output certificate is for an annual fire safety statement as indicated by an included template identifier that identifies a template 50l shown in FIG. 5. Again, the subject is the particular building at a building address and the claims now are whether smoke detectors and fire alarms for that building have passed, noting that these individual tests are captured in dependency certificates 454, 456. Accordingly, template 501 comprises rules 502. This time, the rules do not assert a value but simply port (i.e. copy) the value from the dependency certificates. So at 503 and 504 the rules specify where that value is ported from.

The server retrieves the template 501 and the dependency certificates and performs the actions identified in the rules and creates an entry 510 on the certificate state store. Again, the entry 510 comprises a template identifier, a certificate identifier, a status value, a hash value and references to dependency certificates in the form of dependency certificate identifiers 511, 512.

Finally, the server generates an output certificate 520, which now has the building address under subjects and the values ported from the dependency certificates. Again, a third party can send this certificate to the server for verification. In response, the server queries the state store for entry 510 based on the certificate identifier, verifies the hash value and optionally checks the status of the dependency certificates.

Figure 6A:
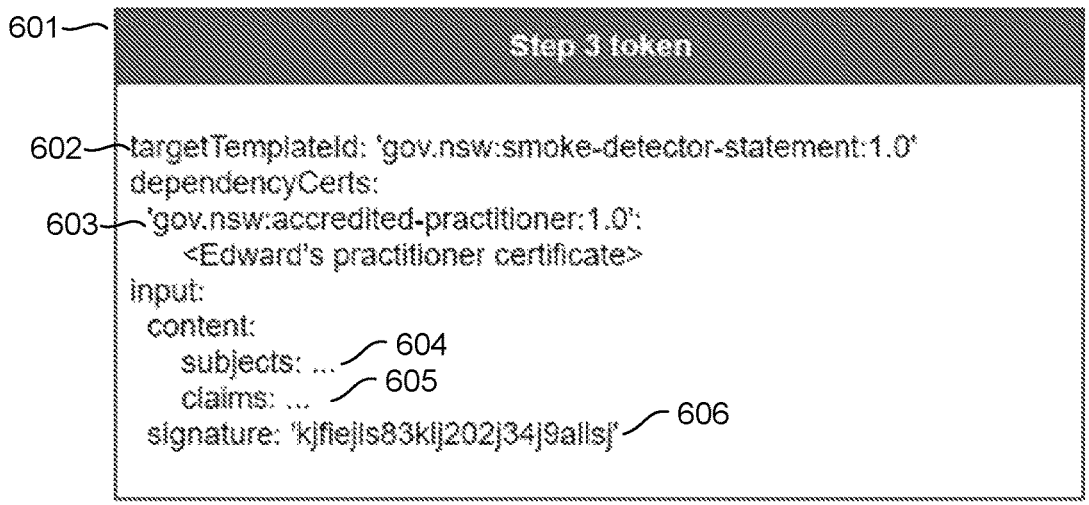
FIGS. 6a, 6b and 6c illustrate different example requests for output certificates.

FIG. 6a illustrates a request 601 for the smoke detector certificate 454 in FIG. 4b. The request may be provided as a single text file that includes all the relevant information, which is therefore also referred to as a token. As can be seen, the request comprises a template identifier 602 as described above and the dependency certificate 603, which can be copied from the text file for that certificate 304. Request 601 further comprises user input content, such as subjects 604, including a building address, and claims 605. Finally, the request 601 comprises a signature 606 that is calculated using a private key of the practitioner to ensure that the input data in request 601 is provided by the practitioner and not by a unauthorised third party. The server then migrates (i.e. copies) the subject and claims from request 601 into certificate 454 in FIG. 4b.

Figure 6B:
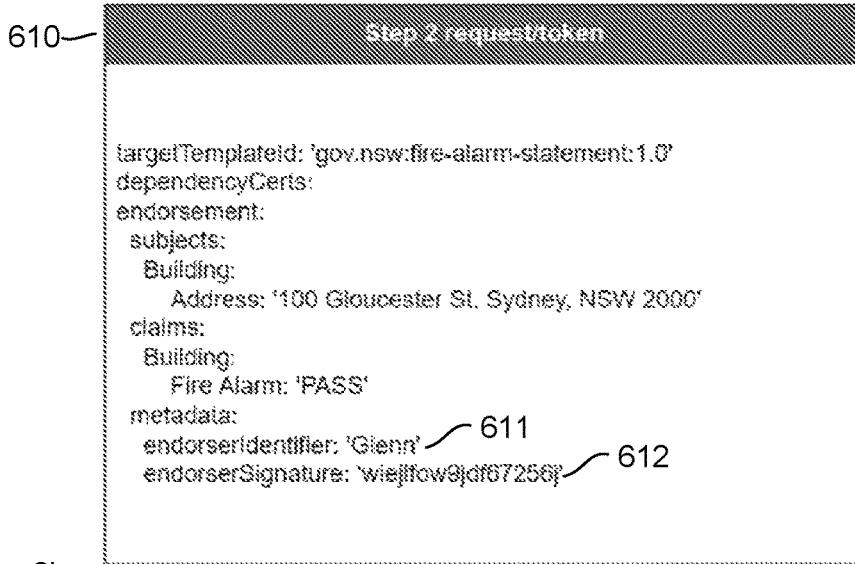
Figure 6C:

Similarly, FIG. 6b illustrates a second request 610 for fire alarm statement 456 that includes the second practitioner certificate 305 and a second signature for the second input data. In this example, the second request 601 comprises metadata that includes the endorser identifier 'Glenn' 611 in addition to the endorser Signature 612. It is noted that the first request 601 can have the same structure as the second request. Finally, FIG. 6c illustrates a third request 620 for annual fire safety statement 520 including the smoke detector certificate 456 and filing alarm certificate 454.

Figure 7:
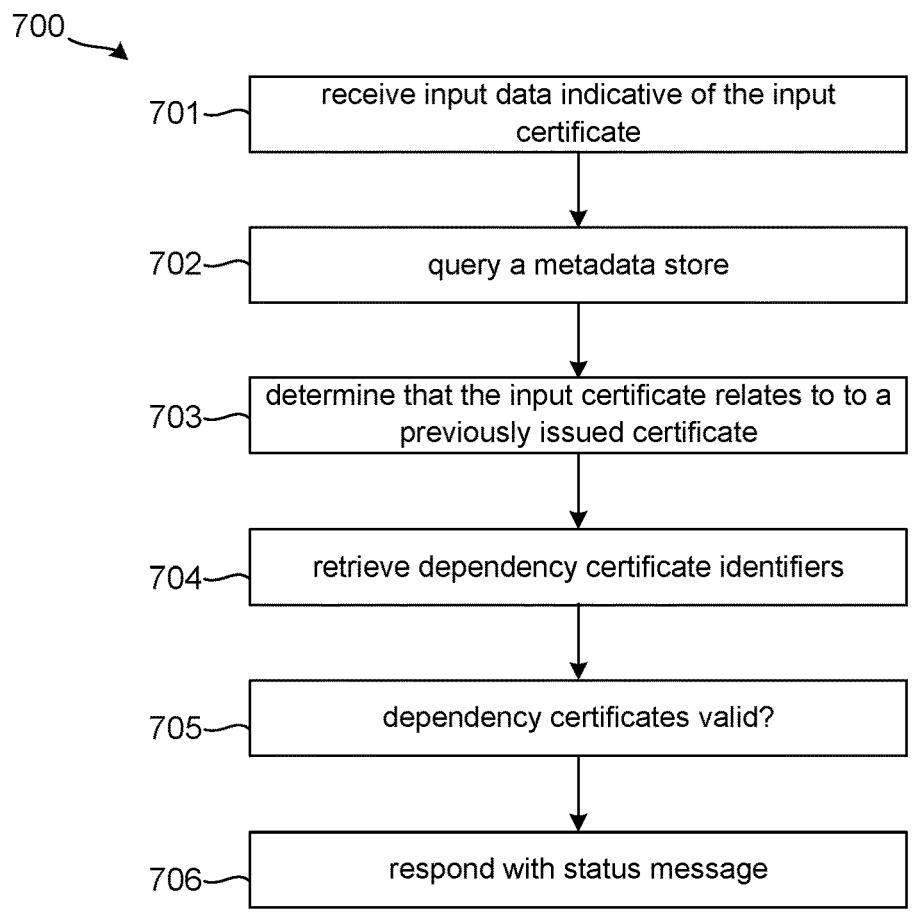
FIG. 7 illustrates a method for verifying an input certificate.

FIG. 7 illustrates a method 700 for verifying an input certificate. According to method 700, as described above, the server receives 701 input data indicative of the input certificate to be verified, such as certificate 520 from FIG. 5, which is identified by a certificate identifier 000000001. The server then queries 702 a metadata store using the certificate identifier to retrieve a metadata entry associated with the certificate identifier. The server then determines 703 that the input certificate 520 relates to or is identical to a previously issued certificate by calculating a hash value of the input certificate 520 and comparing to the hash value 513 stored on a metadata store in the entry 510 associated with the certificate identifier.

Then, the server retrieves 704 one or more dependency certificate identifiers associated with the certificate identifier from the metadata entry and determines 705 that the one or more dependency certificate identifiers relate to valid dependency certificates by querying the metadata store to retrieve their metadata. Then, upon determining that the one or more dependency certificate identifiers relate to valid dependency certificates, the server responds 706 with a success message. Upon identifying a failure, the server responds with a failure message. It is noted that the steps disclosed above as being performed by the server, may be implemented by smart contracts in a Blockchain architecture.

It is noted that the methods disclosed above can be performed recursively in the sense that the server checks the validity of dependency certificates and then, for each dependency certificate checks the validity of further certificates that are listed as dependencies in the dependency certificates and so on.

Figure 8:
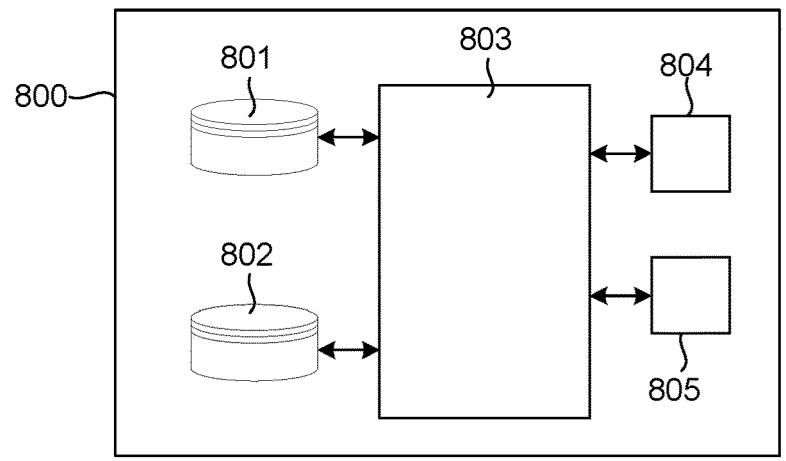
FIG. 8 illustrates a certificate computer sys-tem.

FIG. 8 illustrates a certificate computer system 800. The computer system 800 comprises a rules store 801 configured to store, associated with a template identifier: one or more template identifiers of dependency certificates, one or more attribute paths, and functions to compute one or more output certificate attributes from one or more attributes of the dependencies. these functions may comprise assertions on claim attributes in relation to the dependency certificates. Computer system 800 further comprises a certificate metadata store 802 configured to store, associated with the template identifier and a certificate identifier: a validity state, one or more certificate identifiers of dependency certificates, and a hash value as shown at 302, 303, 451, 452 and 510.

Computer system 800 also comprises a processor 803 configured to generate a certificate by performing the method of claim 2. In particular, the processor 803 receives a request for the output certificate, the request comprising a template identifier and data indicative of one or more dependency certificates. The processor 803 queries a rules store using the template identifier to retrieve a template associated with the template identifier; and computes a value for each of the one or more computed attributes by applying a function from the rules store on attribute values of the one or more dependency certificates. The processor 803 further creates the output certificate including the computed value for each of the one or more computed attributes; and sends the output certificate in a response to the request.

Processor 803 may be further configured to verify an input certificate by receiving an input certificate to be verified. The input certificate is identified by a certificate identifier. The processor 803 determines that the input certificate relates to a previously issued certificate by calculating a hash value of the input certificate and comparing to a hash value stored on a certificate metadata store; and queries the metadata store to retrieve one or more certificate identifiers of dependencies associated with the certificate identifier. Upon determining that the one or more certificate identifiers of dependencies relate to valid dependency certificates, the processor responds with a success message.

It is noted that the methods disclosed herein may be implement as software, that is computer program code that causes the processor 803 to perform those methods or as smart contracts on a Blockchain. More particularly, the computer code is stored on a non-transitory computer readable medium 804, such as a hard disk or flash drive. In executing the program code and therefore performing the disclosed methods, the processor 803 may store generated data on data memory 805, which may be volatile, such as random access memory (RAM).

In operation, that is in a state where all templates are available and require no change, the templates are stored read-only on rules store 801. Further, the certificate state store 802 is read-only by unauthenticated third parties, such as through an internet service or application programming interface (API). But processor 803 is the only entity that can write onto the certificate state store.

Object-Oriented Certificate Template Model

Figure 9:
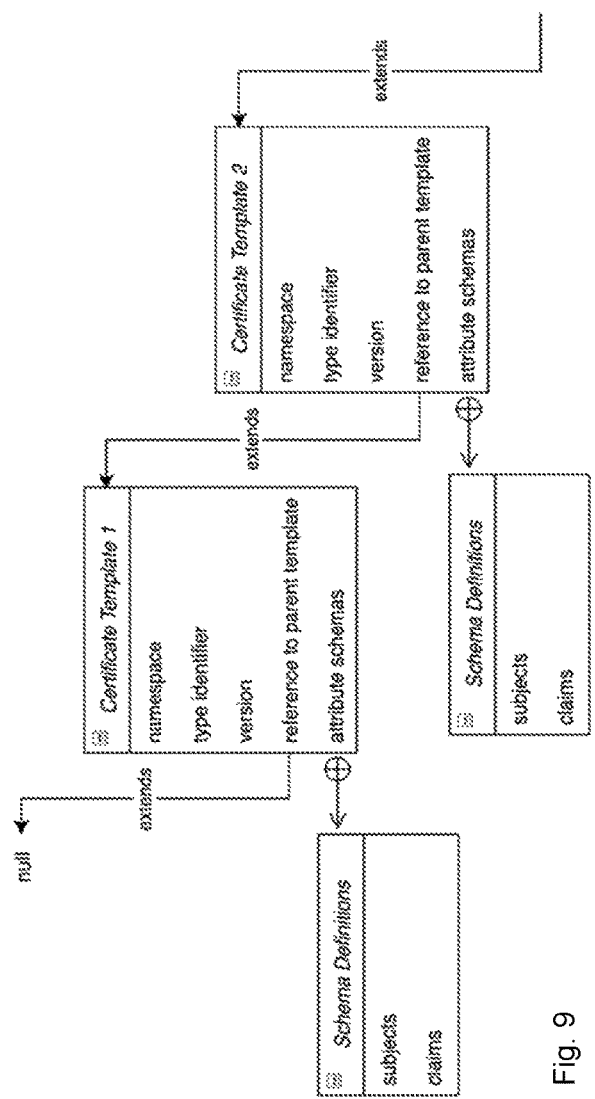
FIG. 9 illustrates an object-oriented certificate template model.

FIG. 9 illustrates an object-oriented certificate template model. In the system, certificate template dictates and enforces attributes' schemas for a certificate type, and at the same time provides the basis for describing certificate generation rules. Certificate template is analogous to class in Object-Oriented Programming, which is the blueprint for the creation of objects. Certificate is analogous to object or instance in Object-Oriented Programming, which instantiates class.

A certificate template contains (but not limited to) the following information:
namespace the template belongs to
certificate type identifier that identifies the template among all templates in the namespace
version of the template
reference to parent template, whose attributes are inherited by this template
certificate attribute schemas
category of each attribute (computed or endorsed)
computation rule of each computed attribute A specific template can be identified and referenced by a globally unique template identifier that combines namespace, type identifier, and version. For example, the reference to parent template can be the template identifier of the parent template.

A template inherits all attribute schemas from its parent template, similar to how subclass inherits superclass in Object-Oriented Programming, so a schema check on a certificate that instantiates the child template against the parent template always passes. Child template extends parent template's schema definitions by adding new attribute schemas. For example, a degree certificate template created by an University can extend an international standard degree certificate template by adding its own attributes. Certificates that instantiate the University's template also comply with the international standard template. This inheritance model enables dependency polymorphism during certificate generation. Using the same example again, if a certificate generation rule requires an international standard degree certificate as a dependency, a certificate from the University is considered as a valid input certificate when provided to the certificate generator, because it instantiates a template that extends the international standard template.

Certificate attribute schemas can be defined and represented using a schema notation specification, such as JSON Schema, Apache Avro, etc. A valid certificate must pass schema check against the schema definition in its template. Attribute schemas may contain schema definition of the following attribute groups:
a group of subjects of this certificate type
a group of claims about the subjects
Computed attributes and their corresponding computation rules, which dictates how those attributes should be computed from a set of dependency certificates, are included as part of the certificate template. The schema in the template of target certificate is used by the certificate generator to validate the schema of generated certificates.

A Rule-Based Certificate Generator

Figure 10:
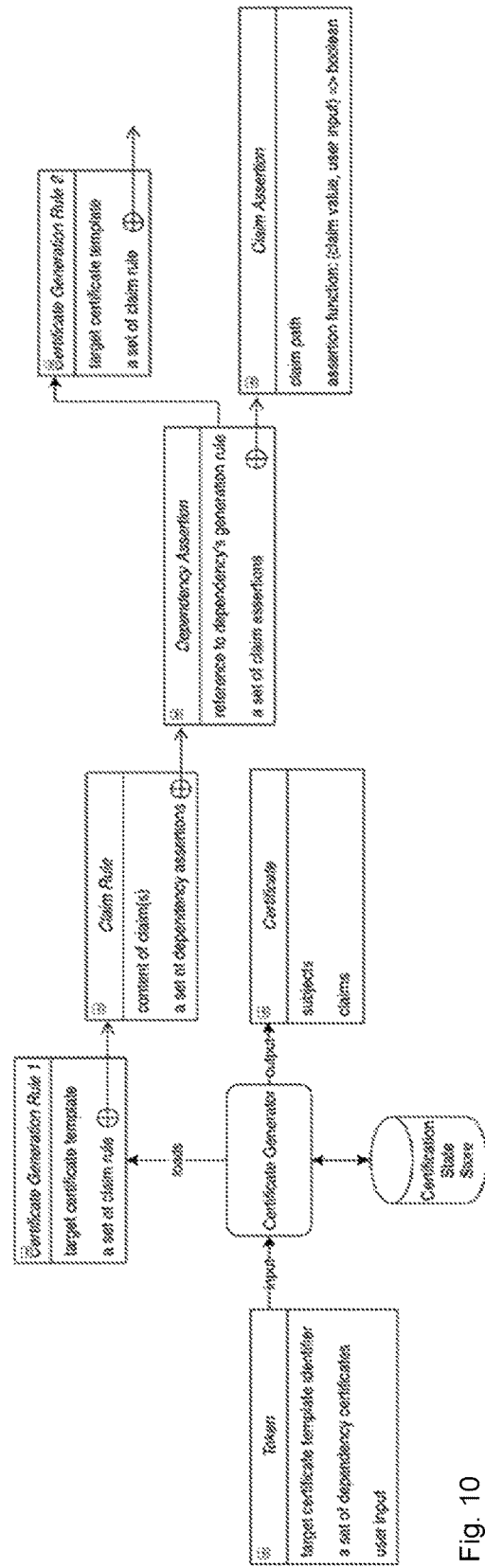
FIG. 10 illustrates a certificate generation object model.

Certificate generation is one of the steps in the certificate issuance process. FIG. 10 illustrates a certificate generation object model. In the system, certificate generator generates new certificate based on a certificate request and a template (the template is retrieved before the generation step, using the template identifier in the request). During the generation step, the issuance program goes through the computed attributes and their corresponding computation rules, as defined in the template, and applies those computation rules on the dependency certificates provided in the request, to compute the values of those attributes. Computation rules are rules for computing attribute values during certificate issuance. A computation rule may be defined by a function and its inputs:
the function can be any combination of arithmetic and/or logical computations on the inputs.
an input is expressed as a (template id, attribute path) pair, referencing an attribute in a template.

In some use cases, a computed attribute can represent whether a criterion is met. In that case, computation rules may dictate the conditions when a claim or a group of claims can be established or when a criterion is met. In that case, A computation rule may specify content of claim(s) in the target certificate (also referred to as "output certificate" above) and the conditions when the claim(s) can be established. The conditions are a set of assertions on certificates and/or user input that the target certificate depends on. For example, the claim that someone, i.e. the subject, is a competent fire safety inspector in a fire safety inspector certificate depends on the assertion that the subject's training certificate from a training institution claims the subject's completion of training and the assertion that the subject's employment certificate from a qualified employer claims that the subject has over 5 years of working experience. A dependency assertion contains:
reference to generation rule of the depended certificate
set of claim assertions, each contains:
claim path, represented in terms of the schema notation specification used in the template model. For example, if JSON Schema was used, claim path would be represented as a JSON path
a function that takes the claim value of the claim path along with the user input and returns a Boolean value to indicate whether the assertion passes or fails Templates, and the schema and computation rules defined in them, are user-defined (by the template designers) and serializable. Computation rules become available for certificate generator to load once the template is saved in the template store via a deployment/publishing process, during which the template is serialised, stored, and indexed by its target template identifier. Thus, a template can be identified and referenced by its target template identifier. During the deployment/publishing process, attribute paths in the computation rule may be validated by checking against attribute schemas specified in the dependency's template.

The execution of certificate generator and the issuance process in general is triggered by a user-provided request/token, which represents the user's intention to generate a new certificate. A request/token contains:
target certificate's template identifier
a list of dependency certificates of the certificate at request (sometimes, depends on the template) a digitally signed endorsement. An endorsement includes attributes to be added to a certificate during issuance.

These attributes are called endorsed attributes. Unlike computed attributes, endorsed attributes are not computed from dependency certificate, but directly supplied by the requestor and endorsed by an endorser trusted by the system.

During the execution, the process of certificate generation include but not limited to the following steps:

loads the computation rules from the retrieved template (optionally) ensures all dependency certificates in the token have the same subject or group of subjects and extracts the common subject(s)

(optionally) ensures all dependency certificates in the token are indeed dependencies of the target certificate by checking against the computation rules (checking the template identifiers of those dependency certificates match a template identifier specified in one of the computation rules).

ensures all dependency certificates are existing/valid certificates generated from the system by checking against the certification metadata store (optionally) loads current certification state, located using the target template identifier and the common subject (s), from state store. Creates new state if not found for each dependency certificate, applies relevant computation rules to obtain values of computed attributes attempts to generate new target certificate by combining the computed attributes with attributes from other sources and checking the aggregated attributes against the attribute schemas in the target certificate template updates the certification state with a summary of the generated certificate, e.g. certificate identifier or hash of the certificate, if generation is successful. Otherwise, updates with reasons of failure writes the updated certification state back to the state store Certificate generator can be viewed as a customisable reducer that reduces a list of dependency certificates along with an endorsement to a single target certificate. The reducer can be partially applied to a subset of required dependencies. This may be realised by storing the certification state for each generation attempt, including intermediate certification state.

From a high level perspective, each template references multiple templates of its dependencies, forming a tree structure. Generation process goes in the direction from leaf to root. Leaf templates do not have dependencies, therefore do not have computed attributes, however, endorsement provided in the token can still be used to dictates the content of its target certificate. In other words, certificates generated based on leaf templates only contain endorsed attributes, which is what happens in the trusted issuer trust model, where all attributes are endorsed by a trusted issuer.

A Tree-Based Certification State Store

Figure 11:
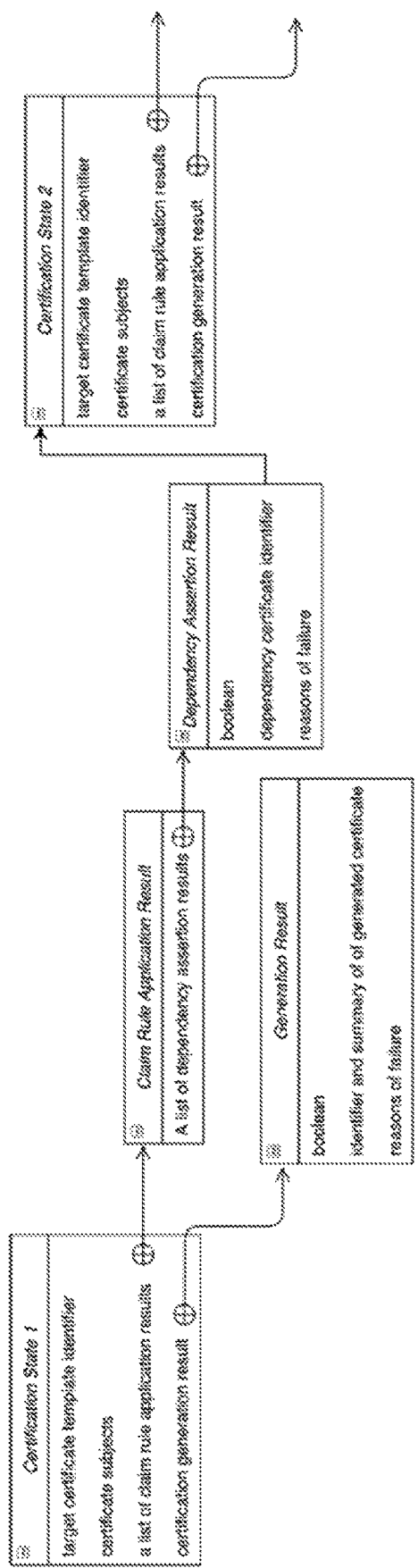
FIG. 11 illustrates a tree-based certification state store.

FIG. 11 illustrates a tree-based certification state/metadata store. Metadata of a certificate is included as an attribute in the certificate, with a reserved attribute path, and therefore is returned to the certificate requestor as part of the certificate. During issuance, metadata of a certificate is also stored in the metadata store, indexed by the certificate identifier. Rule application results and certificate generation result for every certificate generation attempt may also be saved in a certification state store, accessible to the rule-based certificate generator. A certification state/metadata contains but not limited to:

target certificate's template identifier unique identifier of the certificate identifier of the endorser of the certificate the endorser's signature a list of identifiers of certificates, which are dependencies of this certificate hash of the certificate content (optionally) certificate subjects (optionally) rule application results (optionally) certificate generation result Certification state may also be indexed by its target template identifier and subjects to boost performance when loaded by certificate generator.

Rule application results are a list of claim rule application results, each containing information that determines whether a claim or a group of claims specified in the generation rule can be established for the generation of target certificate. The result list is in the same order as the claim rule declarations in the generation rule. Each claim rule application result is a list of dependency assertion results, in the same order as the dependency assertion declarations in the generation rule. A dependency assertion result contains:

a Boolean value that represents whether the dependency certificate passes the assertion or not dependency certificate identifier, if the dependency certificate passes the assertion reasons of failure if the dependency certificate fails the assertion Certificate generation result contains:

a Boolean value that represents whether the generation of target certificate is successful or not generated certificate identifier and summary of certificate, e.g. hash of the certificate, if generation is successful reasons of failure if generation fails From a high level perspective, the certification state associated with a successfully generated certificate contains references to its dependency certificates' certification states, forming a tree structure. This enables certificate verifiers to expand the dependency tree of a certificate, where each node is a certification state containing summary of a dependency certificate. If required, verifiers can compare the dependency certificates' summaries with certificate copies at hand to verify the authenticity of the certificate. For example, if hash is used as summary, verifiers can hash the dependency certificate copy at hand and compare the result with the hash recorded in the corresponding certification state in the dependency tree.

The verification process goes in the direction from root to leaf of the dependency tree. The dependency tree traversal can stop early once reached a certification state with a namespace that the verifier trusts.

Certification state is indexed by generated certificate's identifier to optimise the performance of dependency tree traversal.

Certification state can be updated in-place for each certificate generation attempt if audibility is not a system requirement. To enhance audibility, state store should retain all historic certification state for every certificate. This can be achieved by implementing the state store using Blockchain.

CONCLUSION

This disclosure provides the following elements:

CertificateRequest/CR: issuance method starts from receiving a request for a certificate the request contains RequestTemplateIdentifier/RTI: a template id RequestDependencyCertificates/RDC: (optional, depends on the template) a list of dependency certificates of the certificate at request RequestEndorsement/RE: (optional, depends on the template) a digitally signed endorsement. An endorsement includes attributes to be added to a certificate during issuance:

An endorsement must have the following subset of metadata attributes, including identifier of the endorser the endorser's signature the signature is generated by digitally signing (using endorser's private key) a string representation of the endorsement, where the string representation includes all attributes (name and value) in the endorsement except the signature attribute.

AttributeSet/AS: A certificate is a set of attributes, attributes are key-value pairs (attribute=attribute name+attribute value). Attributes can be nested key-value pairs: An attribute can contain sub-attributes. (Unless stated otherwise, the word "attribute" in this patent also refers to sub-attribute). As a result, each attribute can be addressed by an attribute path.

MetadataAttributes/MA: metadata of a certificate is included as an attribute in the certificate, with a reserved attribute path.

Metadata contains (but not limited to) the following sub-attributes

CertificateIdentifier/CL: unique identifier of the certificate

CertificateTemplateIdentifier/CTI: identifier of the template of the certificate EndorserIdentifier/EL: identifier of the endorser of the certificate EndorserSignature/ES: the endorser's signature MetadataDependencyIdentifiers/MDI: a list of identifiers of certificates, which are dependencies of this certificate CertificateHash/CH: hash of the certificate content AttributeCategory/AC: Non-metadata attributes of a certificate are categorised based on the their source. The certificate's template specifies (explicitly/implicitly) the category (i.e. source) of each non-metadata attribute.

ComputedAttributes/CA: computed attributes attributes that are computed based on attributes from other certificates (i.e. dependency certificates). Computed attributes are specified in the template.

EndorsedAttributes/EA: endorsed attributes attributes that are obtained from a digitally signed endorsement CertificateTemplate/CT: Templates are saved in a template store TemplateIdentifier/TI: Template has a unique identifier, used as index of the template store TemplateSchema/TS: Template specifies schema of attributes (both metadata and non-metadata attributes)

schema defines data type of the attribute values schema defines data range (continuous or discrete) of the attribute values TemplateComputedAttributes/TCA: Template specifies computed attributes by listing their attribute paths and their corresponding computation rules (rules for computing attribute values during certificate issuance).

RuleFunctionInputs/RFI: An attribute computation rule specifies a function and its inputs the function can be any combination of arithmetic and/or logical computations on the inputs.

An input is expressed as a (template id, attribute path) pair, referencing an attribute in a template.

ImplicitEndorsedAttributes/IEA: all attributes that are neither metadata nor computed are considered as endorsed attributes during issuance.

RetrieveTemplate/RT: the issuance method involves retrieving the template from the template store using the template identifier.

GenerateOutputCertificate/GOC: the issuance method involves generating an output certificate based on the request and the retrieved template GenerateProvisionalCertificate/GPC: the issuance method involves generating a provisional certificate based on the request and the retrieved template AddEndorsedAttributes/AEA: extract endorsement from the request, and add attributes of the endorsement to the provisional certificate while preserving attribute path.

AddComputedAttributes/ACA: compute values of all computed attributes, based on the rules specified in the template and the dependency certificates provided in the request, and add those computed attributes to the provisional certificate while preserving attribute path ComputeWithFunctionInputs/CWFI: a computed attribute can be computed by obtaining the value of each input extracting the template id from the input definition retrieving a corresponding dependency certificate from the request with a matching template id extracting the attribute path from the input definition retrieving the attribute value from the corresponding dependency certificate, using the attribute path applying the function (specified in the rule) to the input values, the result will be the computed attribute value AddMetadataAttributes/AMA: generate values of all metadata attributes, and add those attributes to the provisional certificate under their corresponding attribute path SkipEndorseMetadata/SEM: skip generating values for endorser id and signature ObtainCertificateIdentifier/OCI: obtain identifier of the certificate apply a deterministic function on the data in the request, to obtain a unique certificate identifier ObtainTemplateIdentifier/OTI: identifier of the template of the certificate extract the template id from the request DependencyCertificateIdentifiers/DCI: a list of identifiers of dependency certificates extract the identifiers from the dependency certificates provided in the request ComputeCertificateHash/CCH: hash of certificate content apply a hash function on a string representation of the provisional certificate, the string representation contains all certificate attributes (name and value) except the hash attribute AttributeOverwrite/AO: when adding an attribute to the provisional certificate, if that attribute path has an existing value, the existing value will be overwritten by the new value. Therefore the order of adding attributes should follow exactly AEA->ACA->AMA.

CheckSchema/CS: the issuance method involves performing a schema check on the provisional certificate. After passed the check, the provisional certificate becomes the output certificate.

checking the data type and data range of each attribute in the provisional certificate against the schema defined in the template, this is how the issuance method achieves automated criteria check.

SaveCertificateMetadata/SCM: issuance method involves saving the metadata of the output certificate in a metadata store, indexed by the certificate identifier.

ReturnCertificate/RC: the issuance method involves returning the output certificate to the requestor.

CheckDependencies/CD: the issuance method checks the dependency certificates have been issued previously HashComparison/HC: for each dependency certificates in the request, computing the hash of the certificate, extracting its identifier, retrieving its metadata from the certificate metadata store using the identifier, and comparing the hash with the hash attribute value in the metadata KeyStore/KS: Endorser's public keys are saved in a public key store, keyed by endorser's identifier.

VerifySignature/VS: the issuance method checks the signature of the endorsement in the token signatures are verified using the endorser's public key the key is retrieved from the public key store using the endorser's identifier, which is extracted from the endorsement Blockchain/BC: templates, metadata of certificates, and endorsers' public keys are stored on Blockchain SmartContract/SC: certificate issuance and verification method/process is run as one or more smart contracts on Blockchain VerifyCertificate/VC: the verification method involves receiving a certificate to verify retrieving the metadata of the certificate from the metadata store using the certificate's identifier extracting its dependency certificates from the metadata repeat the procedure for each dependency certificate until reaching a leaf of the dependency tree It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for issuing an output certificate, the method comprising:

receiving a request for the output certificate, the request comprising a template identifier and data indicative of one or more dependency certificates, and the output certificate comprising a set of attributes, wherein each attribute has a name and a value;

for each of the one or more dependency certificates, checking that the dependency certificate relates to a previously issued certificate;

querying a rules store using the template identifier to retrieve a template, wherein
the template specifies one or more first attribute paths to first attributes in the output certificate,
the template specifies that values of the first attributes are to be computed based on attributes from the dependency certificates, and
the template specifies a rule for computing an attribute value for each of the one or more first attribute paths;

generating the output certificate based on the request and the template, by:
computing an attribute value for each of the one or more first attribute paths specified in the template, by applying the rule associated with that first attribute path on attribute values in the one or more dependency certificates;
including the computed attribute value for each of the one or more first attribute paths in the output certificate; and sending the output certificate in a response to the request.

2. The method of claim 1, wherein
the template specifies one or more second attribute paths to second attributes in the output certificate,
the template specifies that values of the second attributes are to be digitally signed by a trusted endorser and provided in the request, and
the method comprises:
receiving an endorsement in the request comprising attribute values of the one or more second attribute paths specified in the template, an endorser identifier, and a digital signature associated with the attribute values generated by the endorser using a private key;
verifying the digital signature by querying a public key store with the endorser identifier to retrieve a public key associated with the private key, and verifying the digital signature based on the public key and the endorsement; and
upon successfully verifying the signature, including the endorsed attributes into the output certificate, by:
establishing a precedence order among first attributes and second attributes; and
including an attribute value of an attribute path in the output certificate by, upon determining that the attribute path has an existing attribute value filled by a previous step, determining the attribute value to include based on the precedence order.

3. The method of claim 2, wherein issuing the output certificate comprises:
querying a rules store on a Blockchain to retrieve the template;
querying a public key store on the Blockchain to retrieve the public key;
creating a metadata entry for the output certificate in a metadata store on the Blockchain, the metadata entry containing metadata of the output certificate;
implementing and executing the method for issuing an output certificate as one or more smart contracts deployed on the Blockchain; and
applying a deterministic function on the request to obtain a unique certificate identifier for the output certificate.

4. The method of claim 2, wherein the method comprises:
specifying one or more metadata attributes to be included in the output certificate, the one or more metadata attributes being indicative of one or more of:
certificate identifier of the output certificate,
template identifier of the output certificate,
endorser identifier of the output certificate,
endorser signature of the output certificate,
one or more certificate identifiers of dependency certificates associated with the output certificate, and
hash value of the output certificate;
obtaining the template identifier of the output certificate from the request;

obtaining the certificate identifiers of dependency certificates by extracting certificate identifiers from the dependency certificates in the request;

obtaining the endorser identifier and signature from the endorsement in the request; and including the obtained metadata attribute values in the output certificate by:

establishing a precedence order among first attributes, second attributes and metadata attributes; and including an attribute value of an attribute path in the output certificate by, upon determining that the attribute path has an existing attribute value filled by a previous step, determining the attribute value to include based on the precedence order.

5. The method of claim 1, wherein the template specifies schema of the attributes in the output certificate, the schema specifying, for each attribute path in the output certificate, a value type and a value range of attribute value associated with the attribute path, and the method further comprises checking that the output certificate satisfies the schema specified in the template, by checking that each attribute value in the output certificate is of the correct type and within the correct range.

6. The method of claim 1, wherein certificate metadata attributes are stored on a metadata store and non-metadata attributes are not stored on the metadata store, and the issuance method comprises:

creating a metadata entry in the metadata store, indexed by the certificate identifier of the output certificate; and saving the metadata attributes of the output certificate in the metadata entry.

7. The method of claim 1, wherein a computation rule of an attribute path specifies one or more template identifiers of dependency certificates associated with the attribute path, one or more dependency attribute paths for each of the one or more template identifiers of dependency certificates, and a function for computing an attribute value of the attribute path, where the function can be defined as a combination of arithmetic and logical functions on the attribute values of the one or more dependency attribute paths, and the issuance method comprises:

computing an attribute value of an attribute path with an associated computation rule by:

for each of the one or more template identifiers of dependency certificates specified in the computation rule, finding a dependency certificate with a matching template identifier from the one or more dependency certificates in the request, and extracting one or more attribute values from the dependency certificate using the one or more dependency attribute paths associated with the template identifier of dependency certificate;

obtaining one or more inputs for the function, by gathering the one or more extracted attribute values for each of the one or more template identifiers of dependencies; and applying the function specified in the computation rule on the one or more inputs to obtain the attribute value of the attribute path.

8. The method of claim 1, wherein the method further comprises:

checking that each of the one or more dependency certificates in the request relates to a previously issued certificate by:

calculating a hash value for the dependency certificate;

extracting a certificate identifier from the dependency certificate;

querying the metadata store using the certificate identifier to retrieve a metadata entry; and comparing the calculated hash value against the hash value in the metadata entry retrieved from the metadata store; and calculating a hash value of the output certificate and including the hash value in the metadata attributes of the output certificate.

9. The method of claim 1, wherein the template specifies attribute paths of endorsed attributes implicitly.

10. The method of claim 1, wherein the rule for computing the attribute from the rules store comprises porting attributes from the one or more dependency certificates into the output certificate.

11. The method of claim 1, wherein the rule for computing the attribute from the rules store comprises an assertion on attribute values of the one or more dependency certificates.

12. The method of claim 1, wherein the template comprises the template identifier.

13. A method for verifying an input certificate, the method comprising:

receiving input data indicative of the input certificate to be verified, the input certificate being identified by a certificate identifier;

querying a metadata store using the certificate identifier to retrieve a metadata entry associated with the certificate identifier;

determining that the input certificate relates to a previously issued certificate by calculating a hash value of the input certificate and comparing to a hash value in the metadata entry;

retrieving one or more dependency certificate identifiers associated with the certificate identifier from the metadata entry;

determining that the one or more dependency certificate identifiers relate to valid dependency certificates by querying the metadata store to retrieve their metadata; and upon determining that the one or more dependency certificate identifiers relate to valid dependency certificates, responding with a success message.

14. The method of claim 13, further comprising, upon identifying a failure in validating the input certificate, responding with a failure message.

15. The method of claim 13, wherein the method comprises recursively determining a validity of further certificates referenced by further dependency certificate identifiers in the metadata of dependency certificates.

16. The method of claim 13, wherein verifying the input certificate comprises querying a metadata store on a Blockchain, and implementing and executing the verification method as one or more smart contracts deployed on the Blockchain.

17. A non-transitory computer readable medium with software code stored thereon that, when executed by a computer, causes the computer to perform the method of claim 1.

18. A certificate computer system comprising:
a rules store configured to store, associated with a template identifier:
one or more template identifiers of dependency certificates,
one or more attribute paths, and
functions to compute one or more output certificate attributes from one or more attributes of the dependencies;
a certificate metadata store configured to store, associated with the template identifier and a certificate identifier:
a validity state,
one or more certificate identifiers of dependency certificates, and
a hash value;
a processor configured to generate a certificate by:
receiving a request for the output certificate, the request comprising a template identifier and data indicative of one or more dependency certificates;
querying a rules store using the template identifier to retrieve a template associated with the template identifier;
computing a value for each of the one or more computed attributes by applying a function from the rules store on attribute values of the one or more dependency certificates;
creating the output certificate including the computed value for each of the one or more computed attributes; and
sending the output certificate in a response to the request;
the processor being further configured to verify an input certificate by:
receiving input data indicative of the input certificate to be verified, the input certificate being identified by a certificate identifier;
determining that the input certificate relates to a previously issued certificate by calculating a hash value of the input certificate and comparing to a hash value stored on a certificate metadata store;
querying a metadata store to retrieve one or more certificate identifiers of dependencies associated with the certificate identifier; and
upon determining that the one or more certificate identifiers of dependencies relate to valid dependency certificates, responding with a success message.

* * * * *